United States Patent
Lacapra

(10) Patent No.: US 8,433,735 B2
(45) Date of Patent: **\*Apr. 30, 2013**

(54) SCALABLE SYSTEM FOR PARTITIONING AND ACCESSING METADATA OVER MULTIPLE SERVERS

(75) Inventor: Francesco Lacapra, Sunnyvale, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/972,825

(22) Filed: Dec. 20, 2010

(65) Prior Publication Data

US 2011/0087696 A1    Apr. 14, 2011

Related U.S. Application Data

(63) Continuation of application No. 11/337,190, filed on Jan. 20, 2006, now Pat. No. 7,885, 970.

(60) Provisional application No. 60/646,214, filed on Jan. 20, 2005.

(51) Int. Cl.
    *G06F 7/00*    (2006.01)
(52) U.S. Cl.
    USPC ........................................................ 707/828
(58) Field of Classification Search ........... 707/999.002, 707/821, 828
    See application file for complete search history.

(56) References Cited

U.S. PATENT DOCUMENTS

| | | | |
|---|---|---|---|
| 4,993,030 A | 2/1991 | Krakauer et al. | |
| 5,218,695 A | 6/1993 | Noveck et al. | |
| 5,303,368 A | 4/1994 | Kotaki | |
| 5,473,362 A | 12/1995 | Fitzgerald et al. | |
| 5,511,177 A | 4/1996 | Kagimasa et al. | |
| 5,537,585 A | 7/1996 | Blickenstaff et al. | |
| 5,548,724 A | 8/1996 | Akizawa et al. | |
| 5,550,965 A | 8/1996 | Gabbe et al. | |
| 5,583,995 A | 12/1996 | Gardner et al. | |
| 5,586,260 A | 12/1996 | Hu | |

(Continued)

FOREIGN PATENT DOCUMENTS

| AU | 2003300350 A1 | 7/2004 |
|---|---|---|
| CA | 2080530 A1 | 4/1994 |

(Continued)

OTHER PUBLICATIONS

Cavale, M.R., "Introducting Microsoft Cluster Service (MSCS) in the Windows Server 2003," Microsoft Corporation (Nov. 2002).
Pearson, P.K., "Fast Hashing of Variable-Length Text Strings," Comm. of the ACM 33(6) (Jun. 1990).
Sorenson, K.M., "Installation and Administration: Kimberlite Cluster Version 1.1.0, Rev. D," Mission Critical Linux, http://oss.missioncriticallinux.comkimberlite/kimberlite.pdf.

(Continued)

*Primary Examiner* — Jensen Hu
(74) *Attorney, Agent, or Firm* — LeClairRyan, a Professional Corporation

(57) ABSTRACT

In an aggregated file system, metadata is partitioned into multiple metadata volumes. On receipt of a file processing request, a file switch examines its mount entry cache to identify a target metadata volume that hosts the metadata of the requested file. The identification begins with mount entries at a root volume and continues recursively by examining a portion of the absolute pathname of the file until the target metadata volume is identified. Finally, the file switch forwards the request to a metadata server managing the target metadata volume. Since the identification process is carried out completely within the file switch, there is no need for multiple expensive network accesses to different metadata servers.

36 Claims, 14 Drawing Sheets

U.S. PATENT DOCUMENTS

| | | | |
|---|---|---|---|
| 5,590,320 | A | 12/1996 | Maxey |
| 5,623,490 | A | 4/1997 | Richter et al. |
| 5,649,194 | A | 7/1997 | Miller et al. |
| 5,649,200 | A | 7/1997 | Leblang et al. |
| 5,668,943 | A | 9/1997 | Attanasio et al. |
| 5,692,180 | A | 11/1997 | Lee |
| 5,721,779 | A | 2/1998 | Funk |
| 5,724,512 | A | 3/1998 | Winterbottom |
| 5,806,061 | A | 9/1998 | Chaudhuri et al. |
| 5,832,496 | A | 11/1998 | Anand et al. |
| 5,832,522 | A | 11/1998 | Blickenstaff et al. |
| 5,838,970 | A | 11/1998 | Thomas |
| 5,862,325 | A | 1/1999 | Reed et al. |
| 5,884,303 | A | 3/1999 | Brown |
| 5,893,086 | A | 4/1999 | Schmuck et al. |
| 5,897,638 | A | 4/1999 | Lasser et al. |
| 5,905,990 | A | 5/1999 | Inglett |
| 5,917,998 | A | 6/1999 | Cabrera et al. |
| 5,920,873 | A | 7/1999 | Van Huben et al. |
| 5,937,406 | A | 8/1999 | Balabine et al. |
| 5,991,302 | A | 11/1999 | Berl et al. |
| 5,995,491 | A | 11/1999 | Richter et al. |
| 5,999,664 | A | 12/1999 | Mahoney et al. |
| 6,012,083 | A | 1/2000 | Savitzky et al. |
| 6,029,168 | A | 2/2000 | Frey |
| 6,044,367 | A | 3/2000 | Wolff |
| 6,047,129 | A | 4/2000 | Frye |
| 6,072,942 | A | 6/2000 | Stockwell et al. |
| 6,078,929 | A | 6/2000 | Rao |
| 6,085,234 | A | 7/2000 | Pitts et al. |
| 6,088,694 | A | 7/2000 | Burns et al. |
| 6,104,706 | A | 8/2000 | Richter et al. |
| 6,128,627 | A | 10/2000 | Mattis et al. |
| 6,128,717 | A | 10/2000 | Harrison et al. |
| 6,161,145 | A | 12/2000 | Bainbridge et al. |
| 6,161,185 | A | 12/2000 | Guthrie et al. |
| 6,181,336 | B1 | 1/2001 | Chiu et al. |
| 6,202,156 | B1 | 3/2001 | Kalajan |
| 6,223,206 | B1 | 4/2001 | Dan et al. |
| 6,233,648 | B1 | 5/2001 | Tomita |
| 6,237,008 | B1 | 5/2001 | Beal et al. |
| 6,256,031 | B1 | 7/2001 | Meijer et al. |
| 6,282,610 | B1 | 8/2001 | Bergsten |
| 6,289,345 | B1 | 9/2001 | Yasue |
| 6,308,162 | B1 | 10/2001 | Ouimet et al. |
| 6,324,581 | B1 | 11/2001 | Xu et al. |
| 6,339,785 | B1 | 1/2002 | Feigenbaum |
| 6,349,343 | B1 | 2/2002 | Foody et al. |
| 6,374,263 | B1 | 4/2002 | Bunger et al. |
| 6,389,433 | B1 | 5/2002 | Bolosky et al. |
| 6,393,581 | B1 | 5/2002 | Friedman et al. |
| 6,397,246 | B1 | 5/2002 | Wolfe |
| 6,412,004 | B1 | 6/2002 | Chen et al. |
| 6,438,595 | B1 | 8/2002 | Blumenau et al. |
| 6,466,580 | B1 | 10/2002 | Leung |
| 6,469,983 | B2 | 10/2002 | Narayana et al. |
| 6,477,544 | B1 | 11/2002 | Bolosky et al. |
| 6,487,561 | B1 | 11/2002 | Ofek et al. |
| 6,493,804 | B1 | 12/2002 | Soltis et al. |
| 6,516,350 | B1 | 2/2003 | Lumelsky et al. |
| 6,516,351 | B2 | 2/2003 | Borr |
| 6,549,916 | B1 | 4/2003 | Sedlar |
| 6,553,352 | B2 | 4/2003 | Delurgio et al. |
| 6,556,997 | B1 | 4/2003 | Levy |
| 6,556,998 | B1 | 4/2003 | Mukherjee et al. |
| 6,560,230 | B1 | 5/2003 | Li et al. |
| 6,601,101 | B1 | 7/2003 | Lee et al. |
| 6,606,663 | B1 | 8/2003 | Liao et al. |
| 6,612,490 | B1 | 9/2003 | Herrendoerfer et al. |
| 6,654,346 | B1 | 11/2003 | Mahalingaiah et al. |
| 6,721,794 | B2 | 4/2004 | Taylor et al. |
| 6,728,265 | B1 | 4/2004 | Yavatkar et al. |
| 6,738,357 | B1 | 5/2004 | Richter et al. |
| 6,738,790 | B1 | 5/2004 | Klein et al. |
| 6,742,035 | B1 | 5/2004 | Zayas et al. |
| 6,744,776 | B1 | 6/2004 | Kalkunte et al. |
| 6,748,420 | B1 | 6/2004 | Quatrano et al. |
| 6,754,215 | B1 | 6/2004 | Arikawa et al. |
| 6,757,706 | B1 | 6/2004 | Dong et al. |
| 6,775,672 | B2 | 8/2004 | Mahalingaiah et al. |
| 6,775,673 | B2 | 8/2004 | Mahalingam et al. |
| 6,775,679 | B2 | 8/2004 | Gupta |
| 6,782,450 | B2 | 8/2004 | Arnott et al. |
| 6,801,960 | B1 | 10/2004 | Ericson et al. |
| 6,826,613 | B1 | 11/2004 | Wang et al. |
| 6,839,761 | B2 | 1/2005 | Kadyk et al. |
| 6,847,959 | B1 | 1/2005 | Arrouye et al. |
| 6,847,970 | B2 | 1/2005 | Keller et al. |
| 6,850,997 | B1 * | 2/2005 | Rooney et al. .................. 710/38 |
| 6,871,245 | B2 | 3/2005 | Bradley |
| 6,880,017 | B1 | 4/2005 | Marce et al. |
| 6,889,249 | B2 | 5/2005 | Miloushev et al. |
| 6,914,881 | B1 | 7/2005 | Mansfield et al. |
| 6,922,688 | B1 | 7/2005 | Frey, Jr. |
| 6,934,706 | B1 | 8/2005 | Mancuso et al. |
| 6,938,039 | B1 | 8/2005 | Bober et al. |
| 6,938,059 | B2 | 8/2005 | Tamer et al. |
| 6,959,373 | B2 | 10/2005 | Testardi |
| 6,961,815 | B2 | 11/2005 | Kistler et al. |
| 6,973,455 | B1 | 12/2005 | Vahalia et al. |
| 6,973,549 | B1 | 12/2005 | Testardi |
| 6,975,592 | B1 | 12/2005 | Seddigh et al. |
| 6,985,936 | B2 | 1/2006 | Agarwalla et al. |
| 6,985,956 | B2 | 1/2006 | Luke et al. |
| 6,986,015 | B2 | 1/2006 | Testardi |
| 6,990,114 | B1 | 1/2006 | Erimli et al. |
| 6,990,547 | B2 | 1/2006 | Ulrich et al. |
| 6,990,667 | B2 | 1/2006 | Ulrich et al. |
| 6,996,841 | B2 | 2/2006 | Kadyk et al. |
| 7,003,533 | B2 | 2/2006 | Noguchi et al. |
| 7,006,981 | B2 | 2/2006 | Rose et al. |
| 7,010,553 | B2 | 3/2006 | Chen et al. |
| 7,013,379 | B1 | 3/2006 | Testardi |
| 7,020,644 | B2 | 3/2006 | Jameson |
| 7,020,669 | B2 | 3/2006 | McCann et al. |
| 7,024,427 | B2 | 4/2006 | Bobbitt et al. |
| 7,039,061 | B2 | 5/2006 | Connor et al. |
| 7,051,112 | B2 | 5/2006 | Dawson |
| 7,054,998 | B2 | 5/2006 | Arnott et al. |
| 7,072,917 | B2 | 7/2006 | Wong et al. |
| 7,075,924 | B2 | 7/2006 | Richter et al. |
| 7,089,286 | B1 | 8/2006 | Malik |
| 7,111,115 | B2 | 9/2006 | Peters et al. |
| 7,113,962 | B1 | 9/2006 | Kee et al. |
| 7,120,728 | B2 | 10/2006 | Krakirian et al. |
| 7,120,746 | B2 | 10/2006 | Campbell et al. |
| 7,127,556 | B2 | 10/2006 | Blumenau et al. |
| 7,133,967 | B2 | 11/2006 | Fujie et al. |
| 7,143,146 | B2 | 11/2006 | Nakatani et al. |
| 7,146,524 | B2 | 12/2006 | Patel et al. |
| 7,152,184 | B2 | 12/2006 | Maeda et al. |
| 7,155,466 | B2 | 12/2006 | Rodriguez et al. |
| 7,165,095 | B2 | 1/2007 | Sim |
| 7,167,821 | B2 | 1/2007 | Hardwick et al. |
| 7,171,469 | B2 | 1/2007 | Ackaouy et al. |
| 7,173,929 | B1 | 2/2007 | Testardi |
| 7,194,579 | B2 | 3/2007 | Robinson et al. |
| 7,234,074 | B2 | 6/2007 | Cohn et al. |
| 7,236,491 | B2 | 6/2007 | Tsao et al. |
| 7,280,536 | B2 | 10/2007 | Testardi |
| 7,284,150 | B2 | 10/2007 | Ma et al. |
| 7,293,097 | B2 | 11/2007 | Borr |
| 7,293,099 | B1 | 11/2007 | Kalajan |
| 7,293,133 | B1 | 11/2007 | Colgrove et al. |
| 7,343,398 | B1 | 3/2008 | Lownsbrough |
| 7,346,664 | B2 | 3/2008 | Wong et al. |
| 7,383,288 | B2 | 6/2008 | Miloushev et al. |
| 7,401,220 | B2 | 7/2008 | Bolosky et al. |
| 7,406,484 | B1 | 7/2008 | Srinivasan et al. |
| 7,415,488 | B1 | 8/2008 | Muth et al. |
| 7,415,608 | B2 | 8/2008 | Bolosky et al. |
| 7,440,982 | B2 | 10/2008 | Lu et al. |
| 7,457,982 | B2 | 11/2008 | Rajan |
| 7,467,158 | B2 | 12/2008 | Marinescu |
| 7,475,241 | B2 | 1/2009 | Patel et al. |
| 7,477,796 | B2 | 1/2009 | Sasaki et al. |
| 7,509,322 | B2 | 3/2009 | Miloushev et al. |

| Patent/Publication | Type | Date | Inventor |
|---|---|---|---|
| 7,512,673 | B2 | 3/2009 | Miloushev et al. |
| 7,519,813 | B1 | 4/2009 | Cox et al. |
| 7,562,110 | B2 | 7/2009 | Miloushev et al. |
| 7,571,168 | B2 | 8/2009 | Bahar et al. |
| 7,574,433 | B2 | 8/2009 | Engel |
| 7,587,471 | B2 | 9/2009 | Yasuada et al. |
| 7,590,747 | B2 | 9/2009 | Coates et al. |
| 7,599,941 | B2 | 10/2009 | Bahar et al. |
| 7,610,307 | B2 | 10/2009 | Havewala et al. |
| 7,610,390 | B2 | 10/2009 | Yared et al. |
| 7,624,109 | B2 | 11/2009 | Testardi |
| 7,639,883 | B2 | 12/2009 | Gill |
| 7,644,109 | B2 | 1/2010 | Manley et al. |
| 7,653,699 | B1 | 1/2010 | Colgrove et al. |
| 7,685,177 | B1 | 3/2010 | Hagerstrom et al. |
| 7,689,596 | B2 | 3/2010 | Tsunoda |
| 7,694,082 | B2 | 4/2010 | Golding et al. |
| 7,711,771 | B2 | 5/2010 | Kimos et al. |
| 7,734,603 | B1 | 6/2010 | McManis |
| 7,743,035 | B2 | 6/2010 | Chen et al. |
| 7,752,294 | B2 | 7/2010 | Meyer et al. |
| 7,769,711 | B2 | 8/2010 | Srinivasan et al. |
| 7,788,335 | B2 | 8/2010 | Miloushev et al. |
| 7,809,691 | B1 | 10/2010 | Karmarkar et al. |
| 7,822,939 | B1 | 10/2010 | Veprinsky et al. |
| 7,831,639 | B1 | 11/2010 | Panchbudhe et al. |
| 7,849,112 | B2 | 12/2010 | Mane et al. |
| 7,870,154 | B2 | 1/2011 | Shitomi et al. |
| 7,877,511 | B1 | 1/2011 | Berger et al. |
| 7,885,970 | B2 | 2/2011 | Lacapra |
| 7,913,053 | B1 | 3/2011 | Newland |
| 7,953,701 | B2 | 5/2011 | Okitsu et al. |
| 7,958,347 | B1 | 6/2011 | Ferguson |
| 8,005,953 | B2 | 8/2011 | Miloushev et al. |
| 2001/0007560 | A1 | 7/2001 | Masuda et al. |
| 2001/0014891 | A1 | 8/2001 | Hoffert et al. |
| 2001/0047293 | A1 | 11/2001 | Waller et al. |
| 2001/0051955 | A1 | 12/2001 | Wong |
| 2002/0035537 | A1 | 3/2002 | Waller et al. |
| 2002/0059263 | A1 | 5/2002 | Shima et al. |
| 2002/0065810 | A1 | 5/2002 | Bradley |
| 2002/0073105 | A1 | 6/2002 | Noguchi et al. |
| 2002/0083118 | A1 | 6/2002 | Sim |
| 2002/0087887 | A1 | 7/2002 | Busam et al. |
| 2002/0106263 | A1 | 8/2002 | Winker |
| 2002/0120763 | A1 | 8/2002 | Miloushev et al. |
| 2002/0133330 | A1 | 9/2002 | Loisey et al. |
| 2002/0133491 | A1 | 9/2002 | Sim et al. |
| 2002/0138502 | A1 | 9/2002 | Gupta |
| 2002/0143909 | A1 | 10/2002 | Botz et al. |
| 2002/0147630 | A1 | 10/2002 | Rose et al. |
| 2002/0150253 | A1 | 10/2002 | Brezak et al. |
| 2002/0156905 | A1 | 10/2002 | Weissman |
| 2002/0161911 | A1 | 10/2002 | Pinckney, III et al. |
| 2002/0188667 | A1 | 12/2002 | Kirnos |
| 2002/0194342 | A1 | 12/2002 | Lu et al. |
| 2003/0009429 | A1 | 1/2003 | Jameson |
| 2003/0012382 | A1 | 1/2003 | Ferchichi et al. |
| 2003/0028514 | A1 | 2/2003 | Lord et al. |
| 2003/0033308 | A1 | 2/2003 | Patel et al. |
| 2003/0033535 | A1 | 2/2003 | Fisher et al. |
| 2003/0061240 | A1 | 3/2003 | McCann et al. |
| 2003/0065956 | A1 | 4/2003 | Belapurkar et al. |
| 2003/0115218 | A1 | 6/2003 | Bobbitt et al. |
| 2003/0115439 | A1 | 6/2003 | Mahalingam et al. |
| 2003/0128708 | A1 | 7/2003 | Inoue et al. |
| 2003/0135514 | A1 | 7/2003 | Patel et al. |
| 2003/0149781 | A1 | 8/2003 | Yared et al. |
| 2003/0156586 | A1 | 8/2003 | Lee et al. |
| 2003/0159072 | A1 | 8/2003 | Bellinger et al. |
| 2003/0171978 | A1 | 9/2003 | Jenkins et al. |
| 2003/0177364 | A1 | 9/2003 | Walsh et al. |
| 2003/0177388 | A1 | 9/2003 | Botz et al. |
| 2003/0179755 | A1 | 9/2003 | Fraser |
| 2003/0204635 | A1 | 10/2003 | Ko et al. |
| 2004/0003266 | A1 | 1/2004 | Moshir et al. |
| 2004/0006575 | A1 | 1/2004 | Visharam et al. |
| 2004/0010654 | A1 | 1/2004 | Yasuda et al. |
| 2004/0017825 | A1 | 1/2004 | Stanwood et al. |
| 2004/0025013 | A1 | 2/2004 | Parker et al. |
| 2004/0028043 | A1 | 2/2004 | Maveli et al. |
| 2004/0028063 | A1 | 2/2004 | Roy et al. |
| 2004/0030857 | A1 | 2/2004 | Krakirian et al. |
| 2004/0054777 | A1 | 3/2004 | Ackaouy et al. |
| 2004/0093474 | A1 | 5/2004 | Lin et al. |
| 2004/0098383 | A1 | 5/2004 | Tabellion et al. |
| 2004/0098595 | A1 | 5/2004 | Aupperle et al. |
| 2004/0133573 | A1 | 7/2004 | Miloushev et al. |
| 2004/0133577 | A1 | 7/2004 | Miloushev et al. |
| 2004/0133606 | A1 | 7/2004 | Miloushev et al. |
| 2004/0133607 | A1 | 7/2004 | Miloushev et al. |
| 2004/0133650 | A1 | 7/2004 | Miloushev et al. |
| 2004/0139355 | A1 | 7/2004 | Axel et al. |
| 2004/0148380 | A1 | 7/2004 | Meyer et al. |
| 2004/0153479 | A1 | 8/2004 | Mikesell et al. |
| 2004/0181605 | A1 | 9/2004 | Nakatani et al. |
| 2004/0199547 | A1 | 10/2004 | Winter et al. |
| 2004/0213156 | A1 | 10/2004 | Smallwood et al. |
| 2004/0236798 | A1 | 11/2004 | Srinivasan et al. |
| 2004/0267830 | A1 | 12/2004 | Wong et al. |
| 2005/0021615 | A1 | 1/2005 | Arnott et al. |
| 2005/0050107 | A1 | 3/2005 | Mane et al. |
| 2005/0091214 | A1 | 4/2005 | Probert et al. |
| 2005/0108575 | A1 | 5/2005 | Yung |
| 2005/0114291 | A1 | 5/2005 | Becker-Szendy et al. |
| 2005/0114701 | A1 | 5/2005 | Atkins et al. |
| 2005/0117589 | A1 | 6/2005 | Douady et al. |
| 2005/0160161 | A1 | 7/2005 | Barrett et al. |
| 2005/0175013 | A1 | 8/2005 | Le Pennec et al. |
| 2005/0187866 | A1 | 8/2005 | Lee |
| 2005/0198501 | A1 | 9/2005 | Andreev et al. |
| 2005/0213587 | A1 | 9/2005 | Cho et al. |
| 2005/0246393 | A1 | 11/2005 | Coates et al. |
| 2005/0289109 | A1 | 12/2005 | Arrouye et al. |
| 2005/0289111 | A1 | 12/2005 | Tribble et al. |
| 2006/0010502 | A1 | 1/2006 | Mimatsu et al. |
| 2006/0045096 | A1 | 3/2006 | Farmer et al. |
| 2006/0075475 | A1 | 4/2006 | Boulos et al. |
| 2006/0080353 | A1 | 4/2006 | Miloushev et al. |
| 2006/0106882 | A1 | 5/2006 | Douceur et al. |
| 2006/0112151 | A1 | 5/2006 | Manley et al. |
| 2006/0123062 | A1 | 6/2006 | Bobbitt et al. |
| 2006/0140193 | A1 | 6/2006 | Kakani et al. |
| 2006/0153201 | A1 | 7/2006 | Hepper et al. |
| 2006/0161518 | A1 | 7/2006 | Lacapra |
| 2006/0167838 | A1 | 7/2006 | Lacapra |
| 2006/0179261 | A1 | 8/2006 | Rajan |
| 2006/0184589 | A1 | 8/2006 | Lees et al. |
| 2006/0190496 | A1 | 8/2006 | Tsunoda |
| 2006/0200470 | A1 | 9/2006 | Lacapra et al. |
| 2006/0212746 | A1 | 9/2006 | Amegadzie et al. |
| 2006/0224687 | A1 | 10/2006 | Popkin et al. |
| 2006/0230265 | A1 | 10/2006 | Krishna |
| 2006/0242179 | A1 | 10/2006 | Chen et al. |
| 2006/0259949 | A1 | 11/2006 | Schaefer et al. |
| 2006/0268692 | A1 | 11/2006 | Wright et al. |
| 2006/0271598 | A1 | 11/2006 | Wong et al. |
| 2006/0277225 | A1 | 12/2006 | Mark et al. |
| 2006/0282461 | A1 | 12/2006 | Marinescu |
| 2006/0282471 | A1 | 12/2006 | Mark et al. |
| 2007/0022121 | A1 | 1/2007 | Bahar et al. |
| 2007/0024919 | A1 | 2/2007 | Wong et al. |
| 2007/0027929 | A1 | 2/2007 | Whelan |
| 2007/0027935 | A1 | 2/2007 | Haselton et al. |
| 2007/0028068 | A1 | 2/2007 | Golding et al. |
| 2007/0088702 | A1 | 4/2007 | Fridella et al. |
| 2007/0098284 | A1 | 5/2007 | Sasaki et al. |
| 2007/0136308 | A1 | 6/2007 | Tsirigotis et al. |
| 2007/0208748 | A1 | 9/2007 | Li |
| 2007/0209075 | A1 | 9/2007 | Coffman |
| 2007/0226331 | A1 | 9/2007 | Srinivasan et al. |
| 2008/0046432 | A1 | 2/2008 | Anderson et al. |
| 2008/0070575 | A1 | 3/2008 | Claussen et al. |
| 2008/0104443 | A1 | 5/2008 | Akutsu et al. |
| 2008/0208933 | A1 | 8/2008 | Lyon |
| 2008/0209073 | A1 | 8/2008 | Tang |
| 2008/0222223 | A1 | 9/2008 | Srinivasan et al. |
| 2008/0243769 | A1 | 10/2008 | Arbour et al. |

| | | | |
|---|---|---|---|
| 2008/0282047 | A1 | 11/2008 | Arakawa et al. |
| 2009/0007162 | A1 | 1/2009 | Sheehan |
| 2009/0037975 | A1 | 2/2009 | Ishikawa et al. |
| 2009/0041230 | A1 | 2/2009 | Williams |
| 2009/0055607 | A1 | 2/2009 | Schack et al. |
| 2009/0077097 | A1 | 3/2009 | Lacapra et al. |
| 2009/0089344 | A1 | 4/2009 | Brown et al. |
| 2009/0094252 | A1 | 4/2009 | Wong et al. |
| 2009/0106255 | A1 | 4/2009 | Lacapra et al. |
| 2009/0106263 | A1 | 4/2009 | Khalid et al. |
| 2009/0132616 | A1 | 5/2009 | Winter et al. |
| 2009/0204649 | A1 | 8/2009 | Wong et al. |
| 2009/0204650 | A1 | 8/2009 | Wong et al. |
| 2009/0204705 | A1 | 8/2009 | Marinov et al. |
| 2009/0210431 | A1 | 8/2009 | Marinkovic et al. |
| 2009/0254592 | A1 | 10/2009 | Marinov et al. |
| 2010/0077294 | A1 | 3/2010 | Watson |
| 2010/0211547 | A1 | 8/2010 | Kamei et al. |
| 2011/0087696 | A1 | 4/2011 | Lacapra |
| 2011/0093471 | A1 | 4/2011 | Brockway et al. |

FOREIGN PATENT DOCUMENTS

| | | |
|---|---|---|
| CA | 2512312 A1 | 7/2004 |
| EP | 0605088 A3 | 2/1996 |
| EP | 0 738 970 A1 | 10/1996 |
| JP | 63010250 A | 1/1988 |
| JP | 6205006 A | 7/1994 |
| JP | 06-332782 | 12/1994 |
| JP | 8021924 B | 3/1996 |
| JP | 08-328760 | 12/1996 |
| JP | 08-339355 | 12/1996 |
| JP | 9016510 A | 1/1997 |
| JP | 11282741 A | 10/1999 |
| JP | 2000-183935 | 6/2000 |
| NZ | 566291 A | 12/2008 |
| WO | 02/39696 A2 | 5/2002 |
| WO | WO 02/056181 A2 | 7/2002 |
| WO | WO 2004/061605 A2 | 7/2004 |
| WO | 2006091040 A1 | 8/2006 |
| WO | WO 2008/130983 A1 | 10/2008 |
| WO | WO 2008/147973 A2 | 12/2008 |

OTHER PUBLICATIONS

Thekkath, C.A., et al., "Frangipani: A Scalable Distributed File System" in Proceedings of the 16th ACM Symposium on Operating Systems Principles (Oct. 1997).
Wilkes, J., et al., "The HP AutoRAID Hierarchical Storage System," ACM Transactions on Computer Systems 14(1) (Feb. 1996).
Thekkath et al., "Frangipani: A Scalable Distributed File System," ACM Symposium on Operating Systems Principles 31(5):224-237 (1997).
"The AFS File System in Distributed Computing Environment," www.transarc.ibm.com/Library/whitepapers/AFS/afsoverview. html, last accessed on Dec. 20, 2002.
Aguilera, Marcos K. et al., "Improving recoverability in multi-tier storage systems," International Conference on Dependable Systems and Networks (DSN-2007), Jun. 2007, 10 pages, Edinburgh, Scotland.
Anderson, Darrell C. et al., "Interposed Request Routing for Scalable Network Storage," ACM Transactions on Computer Systems 20(1): (Feb. 2002), pp. 1-24.
Anderson et al., "Serverless Network File System," in the 15th Symposium on Operating Systems Principles, Dec. 1995, Association for Computing Machinery, Inc.
Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).
Apple, Inc., "Mac OS X Tiger Keynote Intro. Part 2," Jun. 2004, www.youtube.com <http://www.youtube.com/watch?v=zSBJwEmRJbY>, p. 1.
Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.

"Auspex Storage Architecture Guide," Second Edition, 2001, Auspex Systems, Inc., www.auspex.com, last accessed on Dec. 30, 2002.
Cabrera et al., "Swift: Storage Architecture for Large Objects," In Proceedings of the—Eleventh IEEE Symposium on Mass Storage Systems, pp. 123-128, Oct. 1991.
Cabrera et al., "Swift: Using Distributed Disk Striping to Provide High I/O Data Rates," Computing Systems 4, 4 (Fall 1991), pp. 405-436.
Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Carns et al., "PVFS: A Parallel File System for Linux Clusters," in Proceedings of the Extreme Linux Track: 4th Annual Linux Showcase and Conference, pp. 317-327, Atlanta, Georgia, Oct. 2000, USENIX Association.
"CSA Persistent File System Technology," Colorado Software Architecture, Inc.: A White Paper, Jan. 1, 1999, p. 1-3, <http://www.cosoa.com/white_papers/pfs.php>.
"Distributed File System: Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.
English Language Abstract of JP 08-328760 from Patent Abstracts of Japan.
English Language Abstract of JP 08-339355 from Patent Abstracts of Japan.
English Translation of paragraphs 17, 32, and 40-52 of JP 08-328760.
English Translation of Notification of Reason(s) for Refusal for JP 2002-556371 (Dispatch Date: Jan. 22, 2007).
Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.
Farley, M., "Building Storage Networks," Jan. 2000, McGraw Hill, ISBN 0072120509.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.
Gibson et al., "NASD Scalable Storage Systems," Jun. 1999, USENIX99, Extreme Linux Workshop, Monterey, California.
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "The Tiger Shark File System," 1996, in proceedings of IEEE, Spring COMPCON, Santa Clara, CA, www.research.ibm.com, last accessed on Dec. 30, 2002.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single 1/0 Space," IEEE Concurrency, Jan.-Mar. 1999, pp. 60-69.
International Search Report for International Patent Application No. PCT/US2008/083117 (Jun. 23, 2009).
International Search Report for International Patent Application No. PCT/US2008/060449 (Apr. 9, 2008).
International Search Report for International Patent Application No. PCT/US2008/064677 (Sep. 6, 2009).
International Search Report for International Patent Application No. PCT/US02/00720, Jul. 8, 2004.
International Search Report from International Application No. PCT/US03/41202, mailed Sep. 15, 2005.
Karamanolis, C. et al., "An Architecture for Scalable and Manageable File Services," HPL-2001-173, Jul. 26, 2001. p. 1-114.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers," 13Th LISA Conf., 1999, pp. 275-282 of the Proceedings.

Klayman, J., Nov. 13, 2008 e-mail to Japanese associate including instructions for response to office action dated May 26, 2008 in corresponding Japanese patent application No. 2002-556371.

Klayman, J., Response filed by Japanese associate to office action dated Jan. 22, 2007 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993. (http://www.ietf.org/ rfc/rfc1510.txt?number=1510).

Korkuzas, V., Communication pursuant to Article 96(2) EPC dated Sep. 11, 2007 in corresponding European patent application No. 02718824.2-2201.

Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.

Long et al., "Swift/RAID: A distributed RAID System", Computing Systems, Summer 1994, vol. 7, pp. 333-359.

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf on Internet.

Norton et al., "CIFS Protocol Version CIFS-Spec 0.9," 2001, Storage Networking Industry Association (SNIA), www.snia.org, last accessed on Mar. 26, 2001.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Peterson, M., "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.

Response filed Jul. 6, 2007 to Office action dated Feb. 6, 2007 for related U.S. Appl. No. 10/336,784.

Response filed Mar. 20, 2008 to Final Office action dated Sep. 21, 2007 for related U.S. Appl. No. 10/336,784.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph -p. 868, col. 1, paragraph 1.

RSYNC, "Welcome to the RSYNC Web Pages," Retrieved from the Internet URL: http://samba.anu.edu.ut.rsync/. (Retrieved on Dec. 18, 2009).

Savage, et al., "AFRAID—A Frequently Redundant Array of Independent Disks," 1996 USENIX Technical Conf., San Diego, California, Jan. 22-26, 1996.

"Scaling Next Generation Web Infrastructure with Content-Intelligent Switching: White Paper," Apr. 2000, p. 1-9 Alteon Web Systems, Inc.

Soltis et al., "The Design and Performance of a Shared Disk File System for IRIX," in Sixth NASA Goddard Space Flight Center Conference on Mass Storage and Technologies in cooperation with the Fifteenth IEEE Symposium on Mass Storage Systems, Mar. 23-26, 1998.

Soltis et al., "The Global File System," in Proceedings of the Fifth NASA Goddard Space Flight Center Conference on Mass Storage Systems and Technologies, Sep. 17-19, 1996, College Park, Maryland.

Stakutis, C., "Benefits of SAN-based file system sharing," Jul. 2000, InfoStor, www.infostor.com, last accessed on Dec. 30, 2002.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"VERITAS SANPoint Foundation Suite(tm) and SANPoint Foundation Suite(tm) HA: New VERITAS Volume Management and File System Technology for Cluster Environments," Sep. 2001, VERITAS Software Corp.

"Windows Clustering Technologies—An Overview," Nov. 2001, Microsoft Corp., www.microsoft.com, last accessed on Dec. 30, 2002.

Zayas, E., "AFS-3 Programmer's Reference: Architectural Overview," Transarc Corp., version 1.0 of Sep. 2, 1991, doc. No. FS-00-D160.

Basney, Jim et al., "Credential Wallets: A Classification of Credential Repositories Highlighting MyProxy," TPRC 2003, Sep. 19-21, 2003.

Botzum, Keys, "Single Sign On—A Contrarian View," Open Group Website, <http://www.opengroup.org/security/topics.htm>, Aug. 6, 2001, pp. 1-8.

Novotny, Jason et al., "An Online Credential Repository for the Grid: MyProxy," 2001, pp. 1-8.

Pashalidis, Andreas et al., "A Taxonomy of Single Sign-On Systems," 2003, pp. 1-16, Royal Holloway, University of London, Egham Surray, TW20, 0EX, United Kingdom.

Pashalidis, Andreas et al., "Impostor: a single sign-on system for use from untrusted devices," Global Telecommunications Conference, 2004, GLOBECOM '04, IEEE, Issue Date: Nov. 29-Dec. 3, 2004. Royal Holloway, University of London.

Tulloch, Mitch, "Microsoft Encyclopedia of Security," pp. 218, 300-301, Microsoft Press, 2003, Redmond, Washington.

Gupta et al., "Algorithms for Packet Classification", Computer Systems Laboratory, Stanford University, CA, Mar./Apr. 2001, pp. 1-29.

Heinz II G., "Priorities in Stream Transmission Control Protocol (SCTP) Multistreaming", Thesis submitted to the Faculty of the University of Delaware, Spring 2003, pp. 1-35.

Internet Protocol,"DARPA Internet Program Protocol Specification", (RFC:791), Information Sciences Institute, University of Southern California, Sep. 1981, pp. 1-49.

Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Modiano E., "Scheduling Algorithms for Message Transmission Over a Satellite Broadcast System," MIT Lincoln Laboratory Advanced Network Group, Nov. 1997, pp. 1-7.

Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

Rosen E., et al., "MPLS Label Stack Encoding", (RFC:3032) Network Working Group, Jan. 2001, pp. 1-22, (http://www.ietf.org/rfc/rfc3032.txt).

Wang B., "Priority and Realtime Data Transfer Over the Best-Effort Internet", Dissertation Abstract, Sep. 2005, ScholarWorks@UMASS.

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

System Initialization

SCALABLE SYSTEM FOR PARTITIONING AND ACCESSING METADATA OVER MULTIPLE SERVERS

RELATED APPLICATIONS

This application is a continuation of U.S. patent application Ser. No. 11/337,190, filed Jan. 20, 2006, which claims priority to U.S. Provisional Patent Application No. 60/646,214, filed Jan. 20, 2005, entitled "Scalable System For Partitioning And Accessing Metadata Over Multiple Servers", each of which is incorporated herein by reference.

This application is related to U.S. patent application Ser. No. 10/043,413, entitled File Switch and Switched File System, filed Jan. 10, 2002, and U.S. Provisional Patent Application No. 60/261,153, entitled File Switch And Switched File System, filed Jan. 11, 2001, both of which are incorporated herein by reference.

FIELD OF THE INVENTION

The present invention relates generally to the field of storage networks, and more specifically to a system and method for partitioning and accessing metadata over multiple servers in an aggregated file system.

BACKGROUND

With the arrival of gigabit and multi-gigabit network technology, storing, accessing and sharing large volumes of data over a network has become more and more efficient. For instance, a single Gigabit Ethernet or FibreChannel connection is capable of communicating data at a rate of up to 240 Megabytes/second (MB/s), which is even faster than most locally attached storage devices. As a result, many users can store and manipulate their data in an aggregated file system that is located remotely and managed by professional system administrators. In order to ensure a smooth and secure operation of the aggregated file system, however, a large amount of metadata needs to be stored and accessed. The volume of metadata and volume of access requests to the metadata may exceed capability of a single metadata server. There is a need, therefore, for an improved aggregated file system for managing large amounts of metadata.

SUMMARY

A system and method is described for partitioning and accessing metadata in multiple metadata volumes in an aggregated file system. The aggregated file system includes a plurality of file servers storing user-specific data, a plurality of metadata servers, each metadata server hosting one or more metadata volumes associated with the user-specific data and a plurality of file switches receiving user requests regarding the user-specific data and acting on the data accordingly.

Each of the metadata volumes has links to some other metadata volumes. As a result, the metadata volumes form a hierarchical structure. This hierarchical structure is built through the use of special metadata files that create the links across distinct metadata volumes. These inter-volume links are called "Mount Entries". In particular, there is a root metadata volume that includes a plurality of mount entries. A respective mount entry is accessible via a pathname and references a respective distinct child metadata volume using a unique volume ID. The respective child metadata volume may, in turn, have its own mount entries further referencing its own respective distinct child metadata volumes using unique volume IDs.

In one embodiment, each metadata volume stores a list of mount entries. At system start-up time, a file switch retrieves mount entries from at least a subset of the metadata volumes and caches them in its memory. The retrieval of the mount entries starts with the root metadata volume and traverses each of the child metadata volumes, recursively. When a user submits to the file switch a processing request including an absolute pathname to a file, the file switch analyzes the absolute pathname of the file and identifies a target metadata volume that hosts the metadata of the requested file. The identification of the target metadata volume begins with the root metadata volume, which is treated as the current metadata volume. The mount entries associated with the current metadata volume are first examined to locate a child metadata volume that matches a portion of the absolute pathname. If no child metadata volume is located, the file switch assumes that the metadata of the requested file is stored in the current metadata volume, which is the target metadata volume. Otherwise, the child metadata volume becomes the current metadata volume and the identification process continues recursively after removing the matched portion of the absolute pathname until a target metadata volume is identified. In other words, when there are no mount entries in the current metadata volume that match a portion of the residual pathname, the current metadata volume is the target metadata volume. In some embodiments, the mount entries are cached in the file switch, thereby enabling searches for a target metadata volume to be completed quickly and efficiently.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the drawings.

FIG. 2b is a diagram illustrating an embodiment of a metadata hierarchical directory structure implemented using a plurality of metadata volumes corresponding to the user view shown in FIG. 2a.

FIG. 2c is a diagram illustrating an embodiment of the metadata hierarchical directory structure partitioned across a plurality of metadata volumes, along with the links that aggregate the structure shown in FIG. 2a.

Like reference numerals refer to corresponding parts throughout the several views of the drawings.

DESCRIPTION OF EMBODIMENTS

Figure 1:
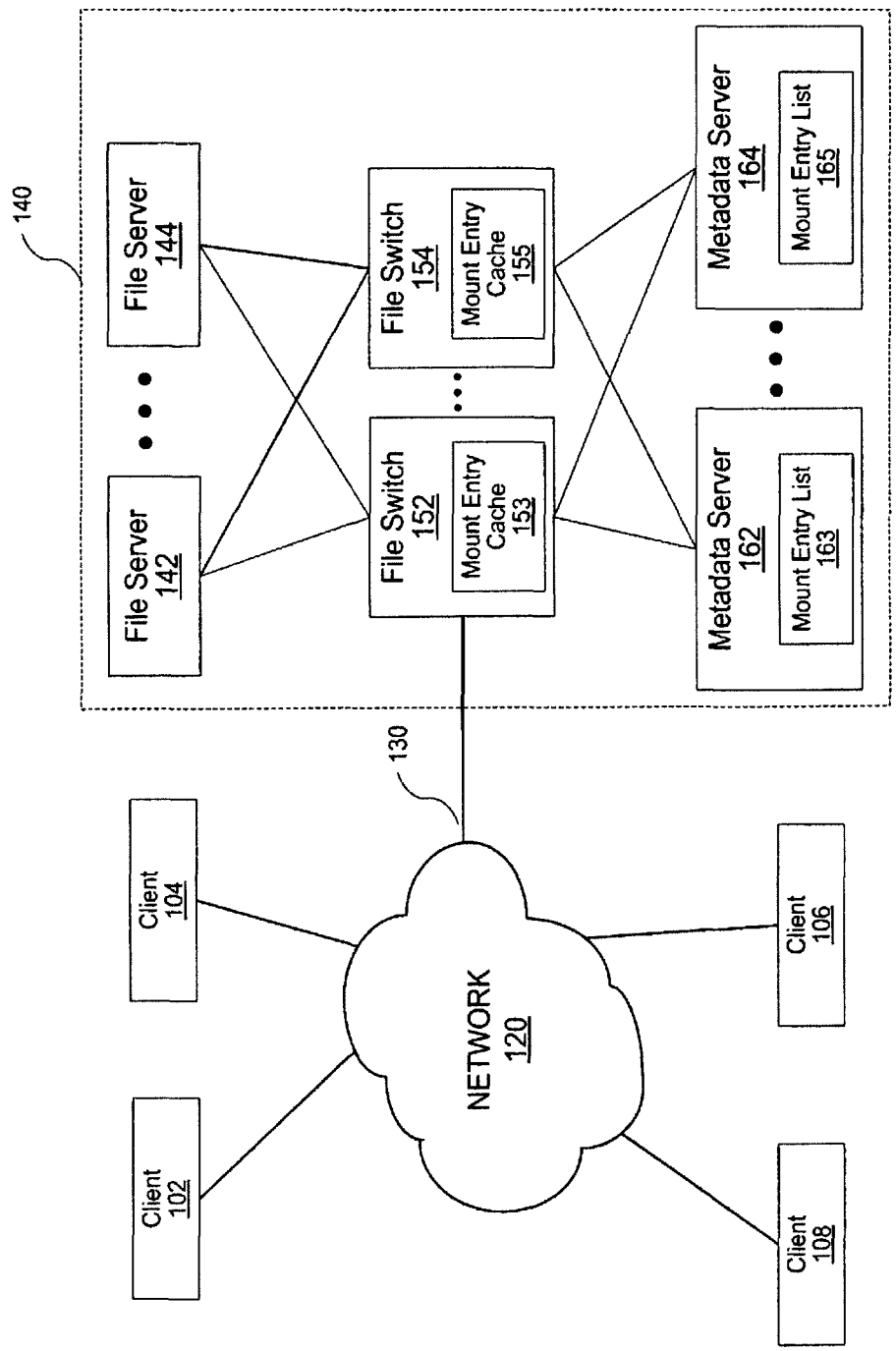
FIG. 1 is a diagram illustrating an embodiment of an aggregated file system.

FIG. 1 illustrates an embodiment of an aggregated file system 140 that includes a group of file servers (142, 144), a group of file switches (152, 154), and a group of metadata servers (162, 164) that have connections to the file servers (142, 144) and the metadata servers (162, 164), respectively. While FIG. 1 shows pairs of file servers (142, 144), file switches (152, 154) and metadata servers (162, 164), some embodiments have more than two file servers, file switches and/or metadata servers. The aggregated file system 140 typically manages a large number of user files. Each file stored by the system 140 has an associated unique pathname, which identifies where the file is stored in a logical hierarchy of directories. The user files may include many types of files, including documents of various types, computer programs, database files, and other types of information storing files.

To be efficient and scalable, the aggregated file system 140 splits the user files into multiple volumes, with a respective file server, such as file server 142, hosting one or more of the multiple volumes. A respective user file also has an associated metadata file storing information identifying at least a subset of the file servers (142, 144) that store the user file and directory structures on the subset of file servers (142, 144).

Typically, the aggregated file system 140 includes one or more file switches (152, 154) that receive a user request, e.g., file open, regarding the user file from one of a plurality of clients (102, 104, 106 and 108) through a communications network 120, e.g., the Internet, and a network interface 130. At least one of the file switches (152, 154), such as file switch 152, acts on the user files stored in one or more of the file servers (142, 144) in accordance with the user request. The user request includes (or, alternately, specifies or identifies) an absolute pathname of the requested user file. Prior to acting on the user file, the file switch 152 needs to identify the exact subset of file servers (142, 144) hosting the user file and determine their respective status. This process of identifying the subset of the hosting file servers (142, 144) for the requested user file is typically implemented as a query to the metadata servers (162, 164) to locate the corresponding metadata file associated with the requested user file.

Figure 2A:
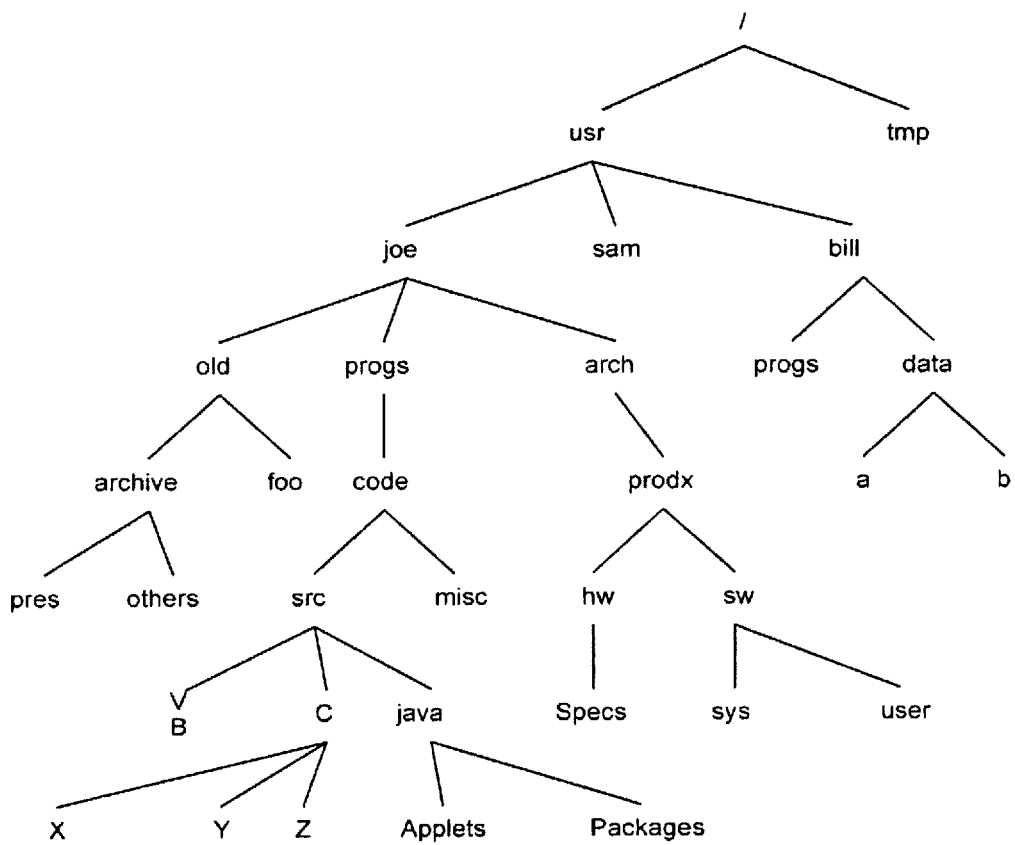
FIG. 2a is a diagram illustrating an embodiment of a user view of a hierarchical directory structure of the aggregated file system.

The user files are organized by a hierarchical directory structure of the aggregated file system 140 (an example is shown in FIG. 2a), that is defined by the metadata directory structure. The primary goal of the query is to scan through the metadata hierarchical data structure to identify a particular metadata file that corresponds to the absolute pathname of the requested user file. The identified metadata file includes information identifying the subset of the file servers (142, 144) hosting the requested user file. However, as discussed above in the background section, a single metadata server, such as metadata server 162, may lack the storage or computational capacity required to host all the metadata files of the aggregated file system 140. Accordingly, the metadata files are also split into multiple volumes. A respective metadata volume is assigned to one of the metadata servers (162, 164), and covers only a portion of the metadata hierarchical directory structure. In some embodiments, more than one metadata volume may be assigned to a metadata server. The group of metadata servers (162, 164) jointly cover the entire metadata hierarchical directory structure through the metadata volumes they manage.

It will be understood by one skilled in the art that FIG. 1 shows two sets of servers for the purpose of illustrating that there are generally two types of data in an aggregated file system. However, the present invention is also applicable to embodiments in which both user data and metadata volumes are physically stored in a same server.

Figure 2B:
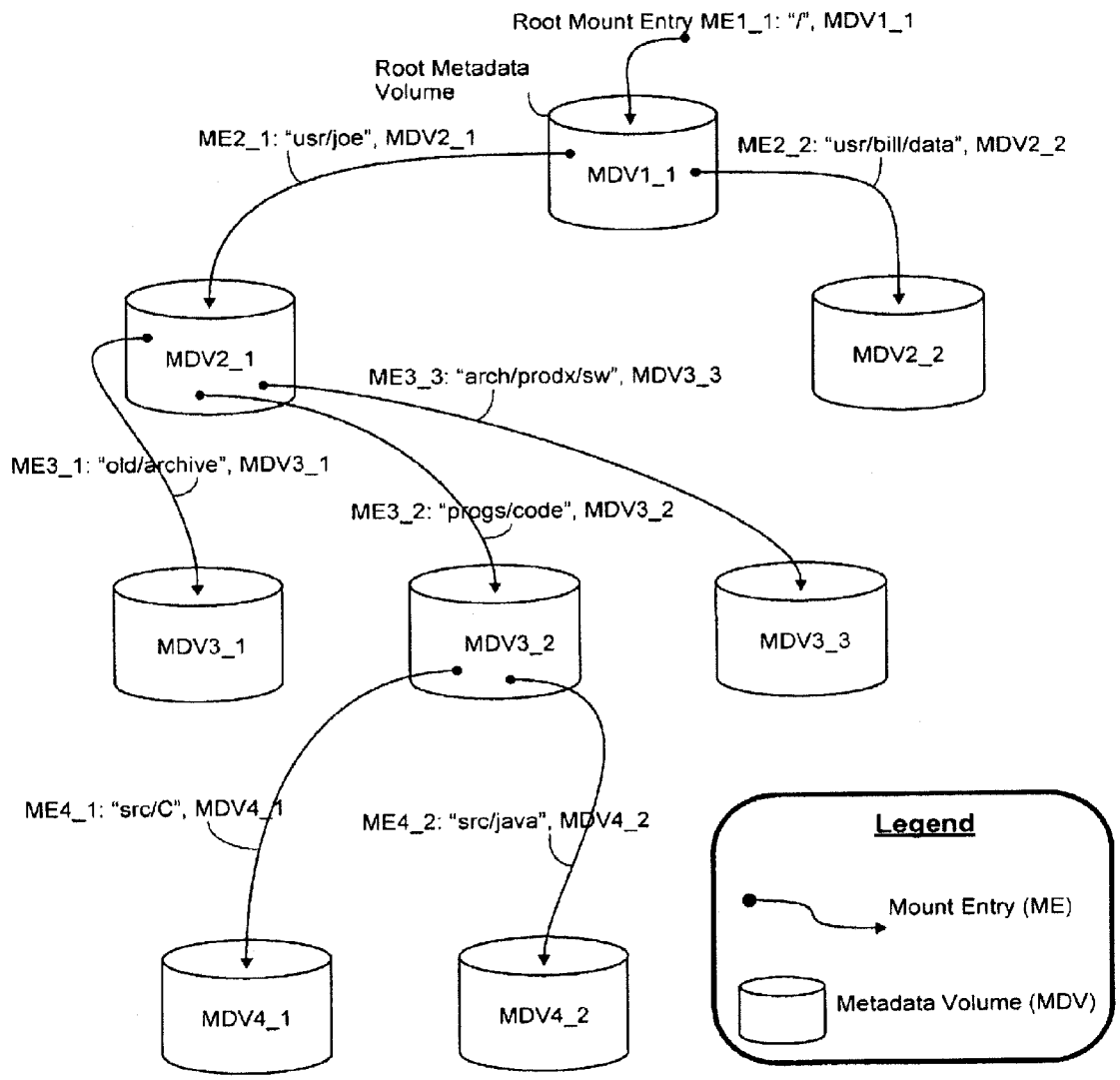
Figure 2C:
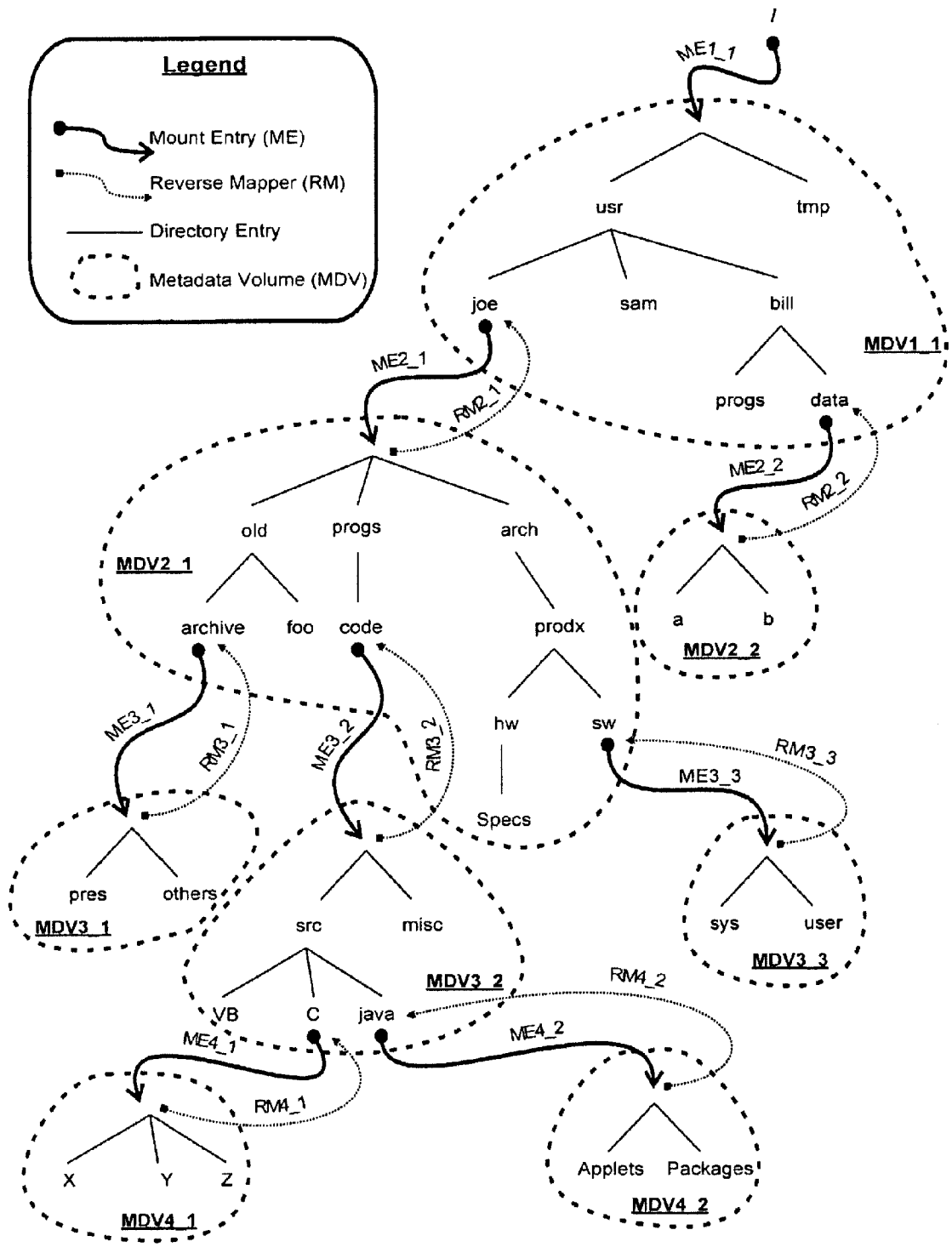

FIG. 2b depicts an illustrative metadata hierarchical directory structure that can support the user view shown in FIG. 2a and implemented using a plurality of metadata volumes (MDV). In this example, there is a root metadata volume, MDV1_1, at the root level that has respective links to a plurality of child metadata volumes MDV2_1 (via Mount Entry ME2_1, whose pathname within MDV1_1 is "usr/joe") and MDV2_2 (via Mount Entry ME2_2, whose pathname within MDV1_1 is "usr/bill/data"). This means that the portion of the file system hierarchy below the root directory of MDV2_1 is effectively seen by the client as being placed beneath the "usr/joe" Mount Entry, and that the latter appears as a directory in MDV1_1 to the client. Metadata volume MDV2_2 has no further links to any other metadata volumes. Metadata volume MDV2_1, however, has links to MDV3_1 (via Mount Entry ME3_1, whose pathname within MDV2_1 is "old/archive"), MDV3_2 (via Mount Entry ME3_2, whose pathname within MDV2_1 is "progs/code") and MDV3_3 (via Mount Entry ME3_3, whose pathname within MDV2_1 is "arch/prodx/sw"). Metadata volumes MDV3_1 and MDV3_3 have no further links, whereas volume MDV3_2 has two more links to MDV4_1 (via Mount Entry ME4_1, whose pathname within MDV3_2 is "src/C") and to MDV4_2 (via Mount Entry ME4_2, whose pathname within MDV3_2 is "src/java"). Finally, volumes MDV4_1 and MDV4_2 have no further links. The resulting file system hierarchy is depicted in FIG. 2c, which identifies individual metadata volumes, Mount Entries and Reverse Mappers, each of which link back the root directory of each child metadata volume to the referencing Mount Entry in its respective parent metadata volume.

The interpretation of pathnames in the metadata service occurs in terms of absolute pathnames that may span multiple metadata volumes. When a pathname to be interpreted is passed to a standard File System running on the root metadata volume, the File System has no knowledge about Mount Entries that appear to it as pure data files. Thus, pathnames that include Mount Entries as intermediate components would cause the File System to return an error indicating that the pathnames does not exist. Therefore, it is necessary to break up absolute pathnames into multiple components so that each component (between two Mount Entries, or between the root of the pathname and a Mount Entry) is interpreted in the context of one specific metadata volume. Since this process must be carried out every time a client sends a request containing a pathname, there is a need for an efficient process to break the absolute pathname into the multiple components and to direct the request containing the final residual portion of the pathname to the metadata volume whose File System can interpret it. The process of retrieving the target metadata volume in response to any pathname could involve hopping across multiple volumes, which may imply network exchanges with various servers. This process potentially has two impacts: 1) the time it takes to get to the target server would be considerably extended by the number of network interactions needed; 2) since the process would start from the root volume, the server that hosts the root volume would have the largest communications load because every pathname translation begins with the root volume.

Therefore, it would therefore be advantageous to provide a metadata access system and process that meets the following requirements: 1) the system or process must be capable of performing partial matches of pathnames through intermediate Mount Entries detection, regardless of the number of pathname components; 2) the system or process must be efficient; 3) the system or process must efficiently handle pathname changes (e.g., pathname changes performed in response to user requests); 4) the system or process must avoid overloading the servers that manage the metadata volumes highest up in the metadata hierarchy, e.g., the root volume; 5) in a system having multiple File Switches (152), all the File Switches should have a common view of the metadata volume hierarchy. Typically, the metadata hierarchy may evolve over time, but only quite slowly. Also, the matching of pathnames must be performed only up to the final Mount Entry (which points to the target metadata volume).

In some embodiments, the volume-resident metadata structures that support the partitioning of metadata are a Mount Entry List, metadata files that implement the Mount Entries and metadata files that implement the Reverse Mappers. Besides providing the basic cross-volume link information, these metadata files also provide a certain amount of redundancy that allows missing links to be reconstructed. Reconstruction may be required, for example, if a system crash leaves the aggregated file system in an inconsistent state. Below are definitions of the three types of objects:

Mount Entries: metadata files that point to a target volume ID. They are the actual cross-volume links interpreted by the aggregated file system that runs in the File Switch. The file system, using this mechanism, makes the root directory of the target volume to which a Mount Entry points appear as if it were located at the pathname of the Mount Entry.

Mount Entry List: these are ancillary metadata files that contain one entry for each Mount Entry in the volume where they reside. Each entry in the list is an ordered pair that provides the pathname of the Mount Entry relative to the root directory of the volume where it resides and the ID of the volume it points to (see FIG. 3*b* for examples of Mount Entry Lists for volumes MDV1_1 and MDV2_1, in the context of the example in FIGS. 2*a* and 2*b*). This file is used in loading the Mount Entry Cache on startup. In one embodiment, this file is the one that is the ultimate reference for the existing Mount Entries in the volume.

Figure 3A:
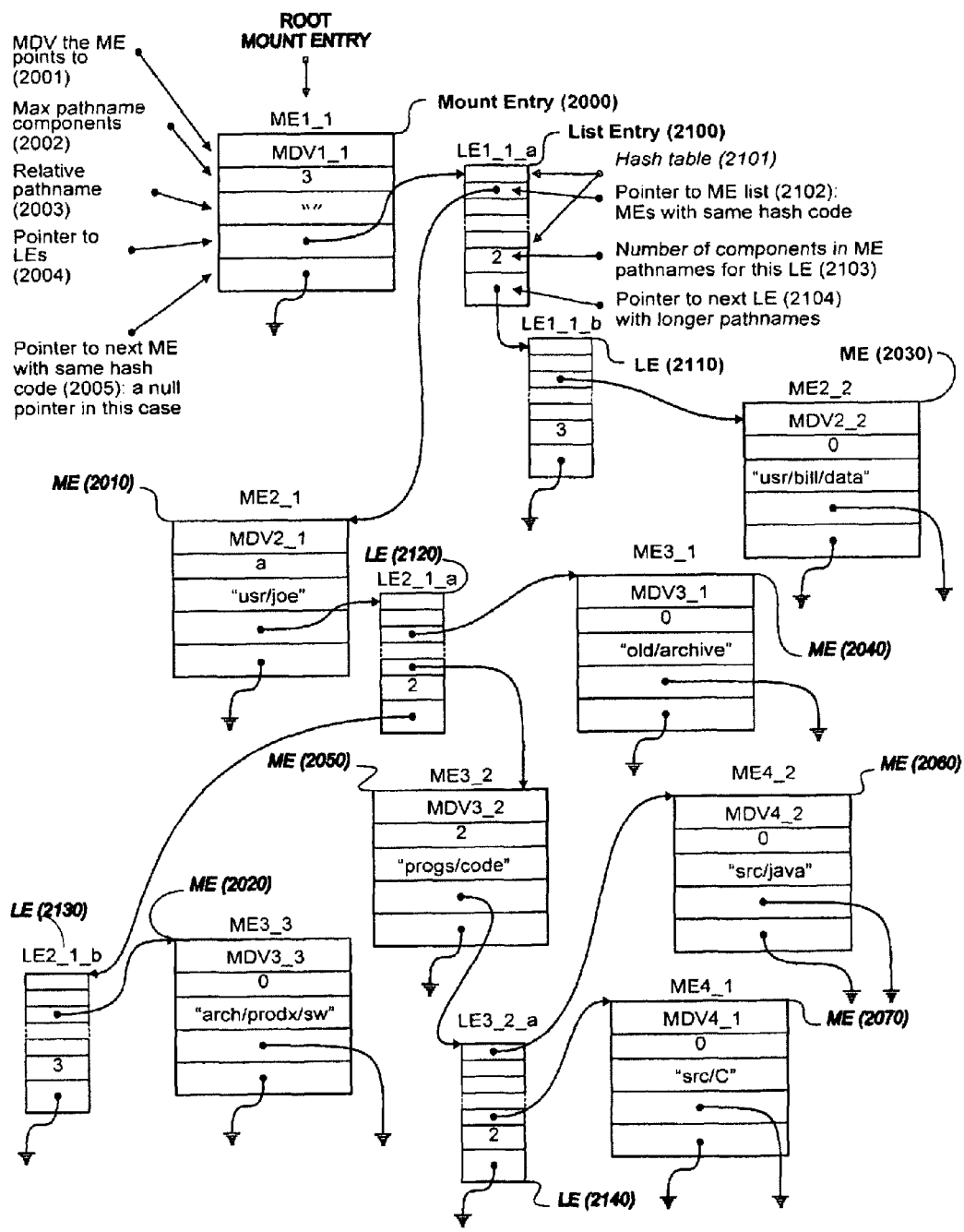
FIG. 3a is a diagram illustrating an embodiment of data structures of the mount entry cache supporting the metadata hierarchical directory structure shown in FIGS. 2b and 2c.
Figure 3B:
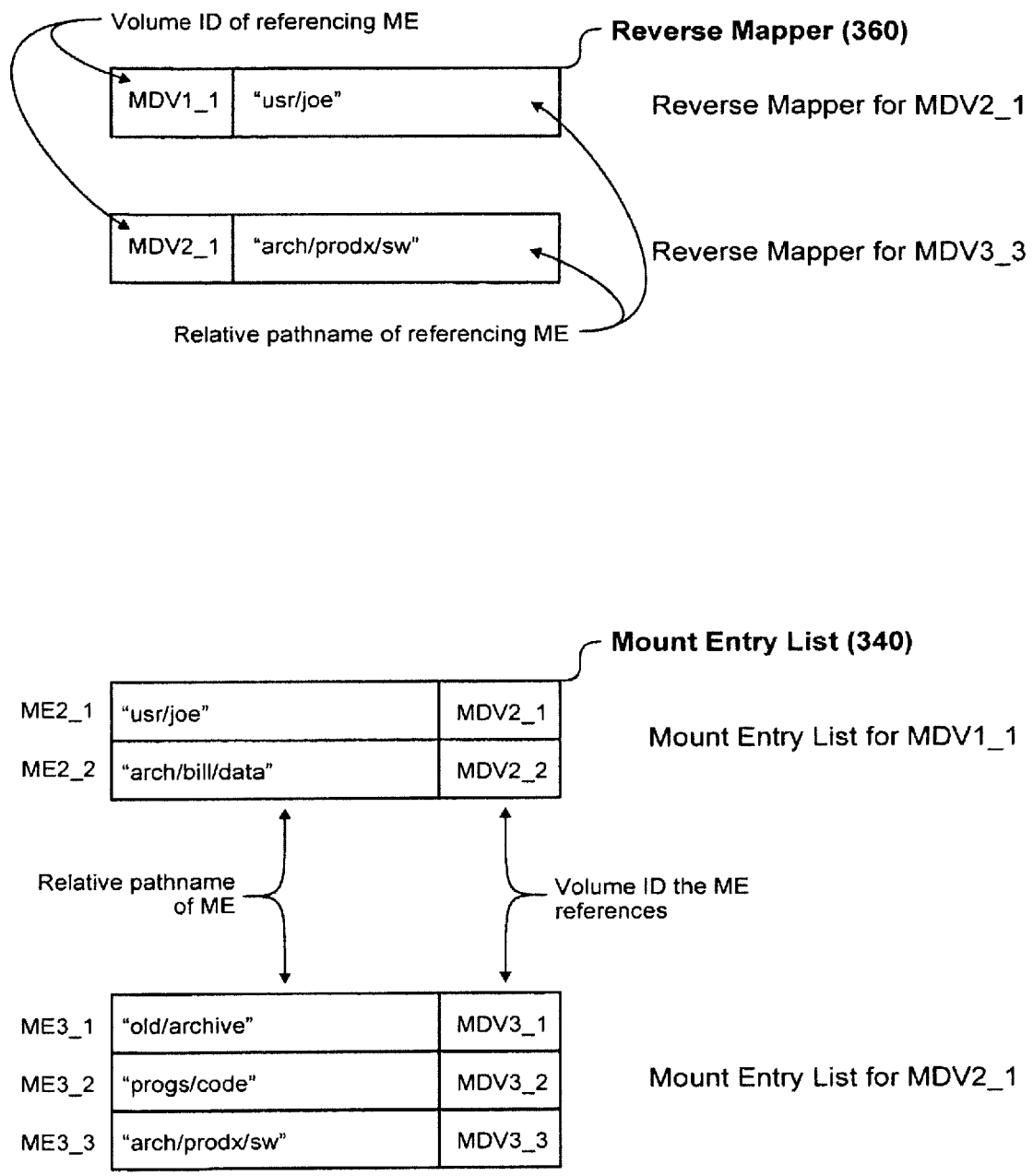
FIG. 3b is a diagram illustrating the content of additional disk-resident metadata structures used to aggregate the metadata hierarchy in FIGS. 2b, 2c and 3a, partitioned across a plurality of metadata volumes.

Reverse Mapper: these are ancillary metadata files of which there is only one in the root directory of each volume. Each such file contains an ordered pair: the ID of the volume where the Mount Entry that references this volume resides and the pathname of the Mount Entry relative to the root directory of the volume where it resides. FIG. 3*b* shows the content of the Reverse Mappers for volume MDV2_1 and MDV3_3 of the example in FIGS. 2*a* and 2*b*.

The requirements related to the partitioned metadata, discussed above, can be met by means of a Mount Entry Cache residing in each File Switch. In some embodiments, the cache contains all the existing Mount Entries, rather than a subset of them that are frequently used.

Figure 4:
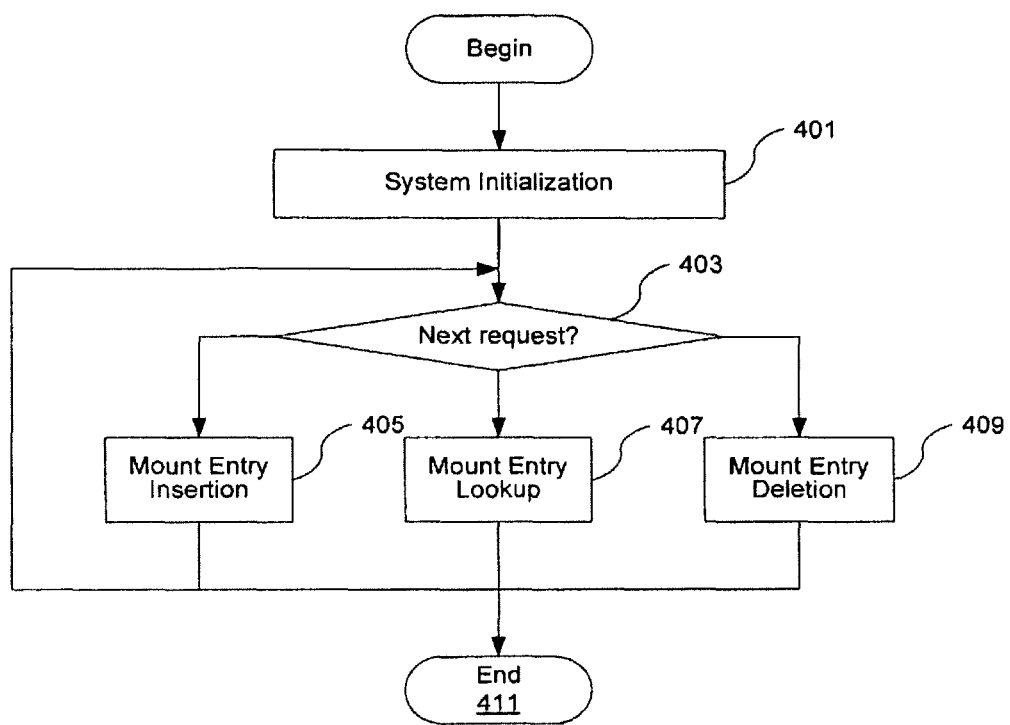
FIG. 4 is an overview flowchart illustrating an embodiment of the operations of the aggregated file system in response to different types of user requests.

FIG. 4 is an overview flowchart illustrating an embodiment of the operations in the aggregated file system 140 (FIG. 1) in response to user requests. The system begins by conducting a system-level initialization 401. More details about this initialization process are provided below in connection with FIG. 5. After the system-level initialization 401, the file switches in the aggregated file system 140 (FIG. 1) wait for a subsequent or next user request 403. Different types of the user requests are followed by different types of operations, such as a mount entry insertion 405, a mount entry lookup 407 or a mount entry deletion 409. After an operation, the system waits for the next user request 403 or terminates operation 411, e.g., a power-off instruction.

Figure 5:
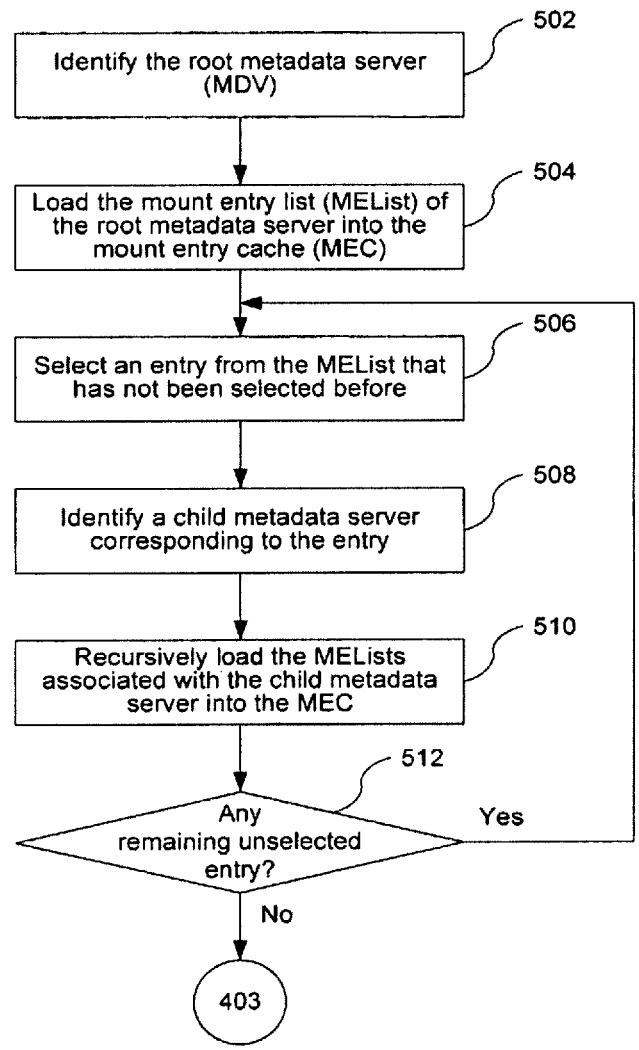
FIG. 5 is a flowchart illustrating an embodiment of the operations in a file switch during system initialization.

FIG. 5 is a flowchart illustrating an embodiment of the operations in the file switch during the system-level initialization 401 (FIG. 4). The file switch identifies the root metadata volume 502 and loads the mount entry list (ME list) of the root metadata volume into a mount entry cache (MEC) 504 of the file switch. An empty ME list indicates that the root metadata volume itself has all the metadata of the aggregated file system 140 (FIG. 1), in which case any user request can be resolved within the root metadata volume itself. However, as shown in FIG. 2*b*, this root metadata volume's ME list typically includes a plurality of list entries and each respective list entry further comprises a group of mount entries. Therefore, the file switch selects an entry from the ME list that has not been selected before 506, identifies the child metadata volume associated with the selected entry 508 and recursively loads the ME list associated with the child metadata volume into the Mount Entry Cache (MEC) 510 until there is no remaining mount entry that has not been selected by the file switch 512. In the context of 506, "the ME List" includes all ME lists that have been loaded into the MEC. At the end of the system-level initialization 401 (FIG. 4), a copy of the metadata hierarchical directory structure of the aggregated file system 140 (FIG. 1) is stored in the MEC of the file switch.

Referring to FIG. 1, since the aggregated file system 140 often includes multiple file switches (152, 154), in some embodiments each of the multiple file switches, such as file switch 152, has its own copy of the metadata hierarchical directory structure in its own mount entry cache (153, 155). In some embodiments, a subset of the multiple file switches (152, 154) have their own copy of the metadata hierarchical directory structure. In one embodiment, each file switch conducts the system-level initialization 401 (FIG. 4) independently to generate its own copy of the metadata hierarchical directory structure. In yet another embodiment, after the metadata hierarchical directory structure is created in the mount entry cache of a respective file switch, it is broadcast and replicated in other file switches. A significant advantage of caching the metadata hierarchical directory structure in the memory of the respective file switch is that it enables the metadata volume, served by the appropriate metadata server such as 162, responsive to a user request to be efficiently identified—because it eliminates the need to retrieve metadata from multiple volumes.

Figure 6:
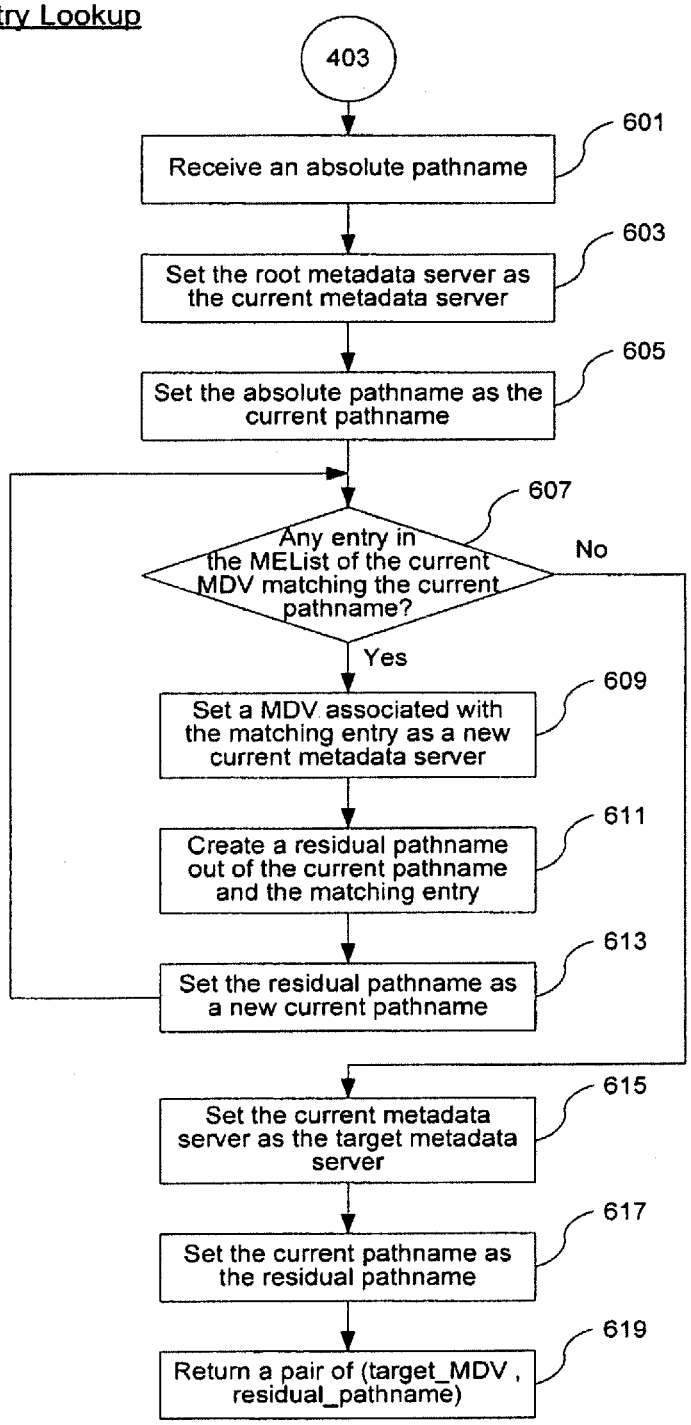
FIG. 6 is a flowchart illustrating an embodiment of the operations in a mount entry lookup with respect to the metadata hierarchical directory structure.

Depending on the types of the user requests, there are three primary operations associated with the metadata hierarchical directory structure in the MEC. FIG. 6 is a flowchart illustrating an embodiment of the operations in the mount entry lookup 407 (FIG. 4), which is the most typical operation of the three. On receipt of the user request for accessing a user-specified file 403, the file switch retrieves an absolute pathname of the user-specified file from the user request (601).

The file switch sets the root metadata volume as the current metadata volume (603), sets the absolute pathname as the current pathname (605) and examines its associated mount entries for any one whose relative pathname partially matches the current pathname (607). If a matching mount entry is found, the file switch sets the metadata volume associated with the matching entry as the new current metadata volume (609), creates the residual pathname by removing the relative pathname of the matching entry from the current pathname (611), sets the residual pathname as the new current pathname (613) and returns to operation (607) to search for another matching mount entry in the new current ME list for the metadata volume.

The aforementioned process repeats itself recursively until no mount entry is found in the ME list of the current metadata volume whose relative pathname matches a beginning portion of the current pathname. Then the file switch sets the current metadata volume as the target metadata volume (615), sets the current pathname as the residual pathname (617) and information identifying the target metadata volume and the residual pathname is returned (619) to the file switch. Based on the returned information, the file switch may directly visit the location in the target metadata volume as represented by the residual pathname and retrieve the corresponding metadata information associated with the user-specified file.

An efficient Mount Entry Cache capable of matching strings could be based on a tree data structure. This would be adequate if pathname changes are infrequent. However, since the pathname changes are controlled by client applications, there is no such guarantee. A preferred design for the Mount Entry Cache is based on the following. The cache is organized as a tree of descriptors for Mount Entries pointing to physical metadata volumes. Each Mount Entry that references a volume containing Mount Entries points to one or more List Entries. For example, the file system tree in FIG. 2*a*, and implemented as shown in FIGS. 2*b* and 2*c* is stored in the Mount Entry Cache as in FIG. 3*a*. The tree (FIG. 3*a*) has a root node, root Mount Entry ME1_1. In some embodiments, each Mount Entry (ME1_1, ME2_1, ME2_2, ME3_1, ME3_2, ME3_3, ME4_1, ME4_2 in FIGS. 2*b* and 2*c*) stores the ID of the associated physical volume, the relative pathname of the Mount Entry (which would be null for the root Mount Entry, ME1_1, as shown in FIG. 3*a*), the maximum number of pathname components for the Mount Entries in the associated physical volume, and a linked list of List Entries that point or link to all the Mount Entries in the volume. One List Entry exists for each set of Mount Entries that are contained in the volume referenced by the parent Mount Entry and that have the same number of pathname components. Within each List Entry, the number of pathnames components for all the Mount Entries the List Entry references is stored. Each List Entry also points to the next List Entry, if any. The list of List Entries is ordered by the number of components in the pathnames of the listed Mount Entries. In some embodiments, each List Entry contains a hash table that allows access to the Mount Entries via the hash code computed from the absolute pathname of the Mount Entry. Mount Entries with the same hash code are accessed as a linked list reference by the bucket or record associated with the hash code (e.g., the hash table may point to the first entry of the linked list, or may point to a record that contains or points to the first entry of the linked list).

Mapping a given absolute pathname into the Mount Entry that points to the appropriate metadata volume is accomplished by searching for a Mount Entry that either exactly matches all the components in the pathname, or for a terminal Mount entry that is a partial match, i.e., an exact match to a stem of the pathname. The search is based on efficiently matching strings of variable length until the maximal match is found.

In some embodiments, the data structures used to perform the matching (see FIG. 3*a*) and the associated algorithm (see FIGS. 6 and 7) minimize the computational resources used to map a pathname to a matching Mount Entry. The input pathname is scanned and a hash code is generated for the pathname. The data structures in use are two: the Mount Entries (2000, 2010, 2020, 2030, 2040, 2050, 2060 and 2070 in FIG. 3*a*) and the List Entries (2100, 2110, 2120, 2130 and 2140 in FIG. 3*a*). A Mount Entry (ME) 2000 in FIG. 3*a* comprises the following fields:

the ID of the MDV the ME points to (2001)—in this case this entry (the root ME) points to MDV1_1;

the maximum number of pathname components in the MEs that are within the MDV this ME points to (2002)—this field would be set to 0 if there were no MEs in the MDV, in this case it is set to 3, as there are subordinate MEs with pathname counts of 2 and 3;

the relative pathname of this ME with respect to the root directory of the volume (2003)—for this ME the relative pathname is a null string as this ME is the global file system root;

a pointer to an LE that points to MEs within this MDV (2004)—this would be a null pointer if there were no MEs in the MDV this ME points to, in this case it points to LE 2100;

a pointer to the next ME, if any, that has the same hash code as this ME (2005)—this is a null pointer when there are no other MEs, as in the case of this ME.

In some embodiments, a List Entry (LE), such as LE 2100, includes the following fields:

a hash table (2101) in which each non-null item (2102) is a pointer to a list of MEs whose hash code maps to that hash table entry;

the count of components in the MEs that this LE points to (2103)—in this case, pathnames with two components; and a pointer to the next LE (2104), if any, where the next LE points to MEs within the same volume with a number of pathname components that is higher than the number of pathname components for the MEs referenced by the current LE. For example, the next LE pointer in LE 2100 points to LE 2110, which points to MEs having three pathname components.

Figure 7:
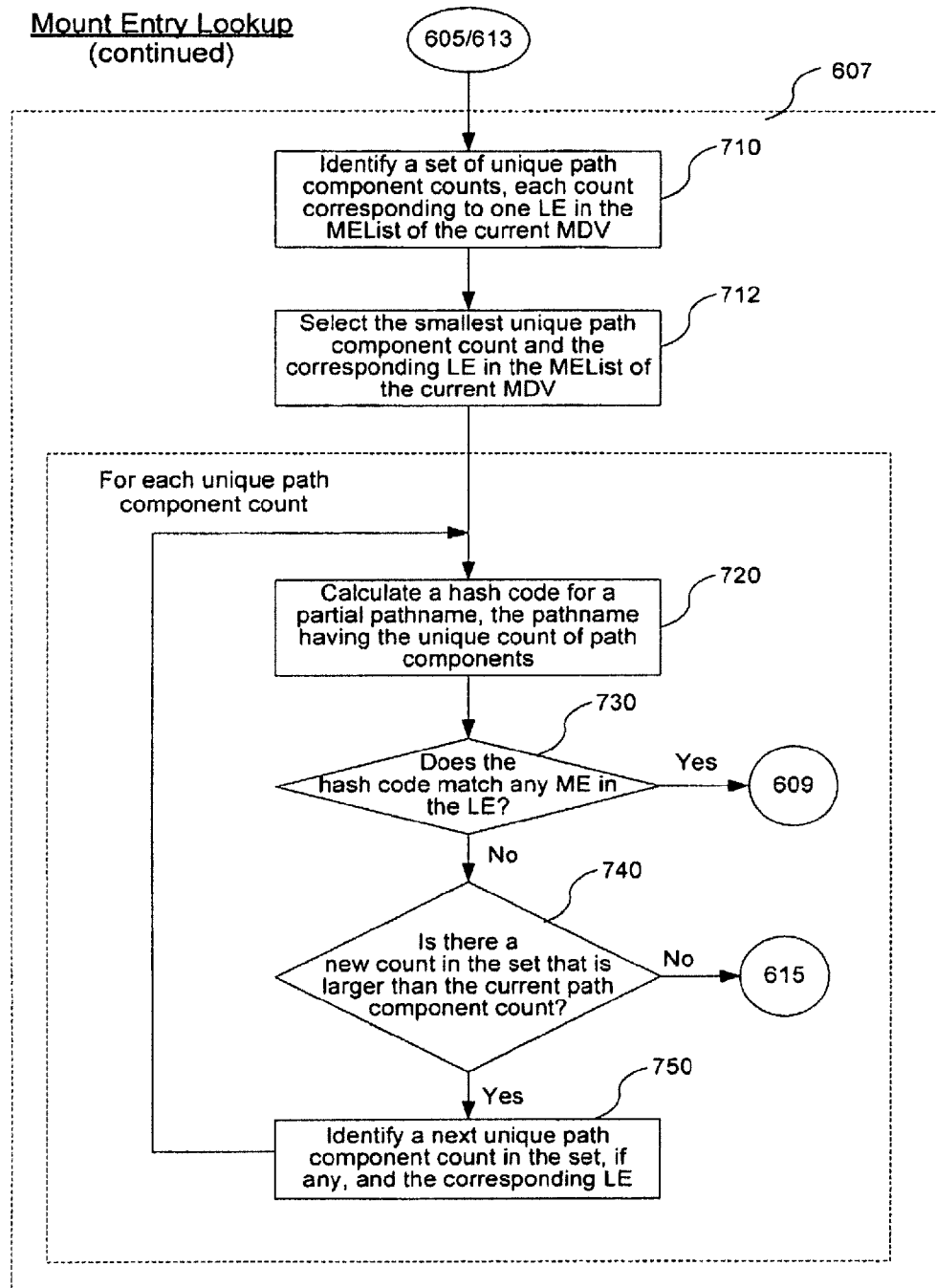
FIG. 7 is a flowchart further illustrating an embodiment of the operations in identifying the matching mount entry in the respective metadata volume.

A flowchart of the pathname lookup process used in some embodiments is shown in FIGS. 6 and 7. FIG. 7 is a flowchart illustrating the operations of identifying the matching mount entry 407 (FIG. 4) within a metadata volume. In particular, FIG. 7 represents one implementation of operation 607, which searches for a matching mount entry within the current metadata volume.

Figure 11:
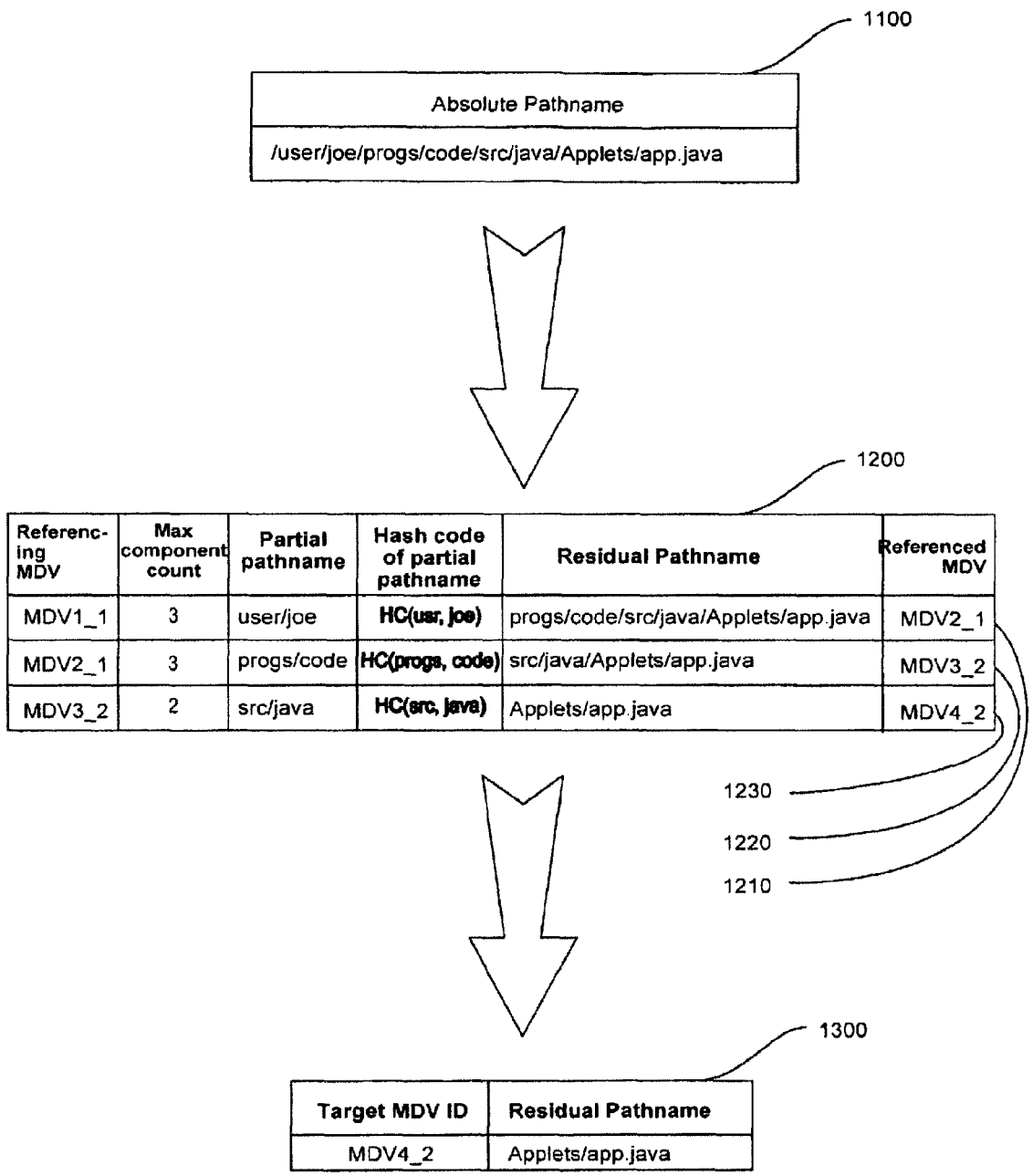
FIG. 11 is a diagram illustrating an exemplary embodiment of identifying a target metadata volume and a residual pathname in response to an absolute pathname.

To look at a concrete example, let's examine the case in FIG. 11, in which the pathname "/usr/joe/progs/code/src/java/Applets/app.java" is to be looked up on the file system of FIG. 2*a*, built on the MDV's shown in FIG. 2*b*. The steps are carried out on the basis of the data structure in FIG. 3*a* and are shown in synthesis in table 1200 of FIG. 11:

In the first step, the pathname is handed off to the lookup engine of the Mount Entry Cache. The engine starts with the root ME (2000), after having removed the starting forward slash. So, at this point the pair to be interpreted is made of ME1_1 (pointing to MDV1_1) and of the residual pathname: "usr/joe/progs/code/src/java/Applets/app.java".

The hash code for the pathname is computed. This computes a different hash code for each preliminary or beginning portion of the pathname up to the maximum number of components specified in ME1_1 (field 2002). In this example, the hash codes are computed for the strings: "usr", "usr/joe" and "usr/joe/progs". In some embodiments, the hash code for each string is computed incrementally from the previous one.

Now, LE 2100 is looked at: it handles pathnames with 2 components (field 2103), therefore the first hash code need not be used, and the second one will be selected. This will map to a given entry within the hash table (2101). Therefore, the link will be followed until an ME that matches the second string is found. This leads to ME2_1 (2010) and to a residual pathname of "progs/code/src/java/Applets/app.java" (step 1210 in FIG. 11). In general, the lookup could have been unsuccessful if the pathname comprised just one pathname component or if no match for "usr/joe" had been found. In the first case, the resulting pair would be made of MDV 1_1 and pathname "usr/joe/progs/code/src/java/Applets/app.java". In the second case, the lookup would have continued with the following LE in the list (2110), which is used to locate or match pathnames having three components.

The starting point now is ME2_1 (2010) and the residual pathname is "progs/code/src/java/Applets/app.java". The maximum number of components handled within the context of ME2_1 is three. So, the pathname strings to be considered are: "progs", "progs/code" and "progs/code/src" and the three hash codes are incrementally computed.

Now, LE 2120 is looked at. Since it deals with pathnames with two components, the string to be considered is: "progs/code". The hash code for this string maps to ME3_2 (2050) and the strings match (step 1220 in FIG. 11). So, the next step is to interpret the residual pathname "src/java/Applets/app.java", in the context of MDV3_2.

At the new starting point, the pathname strings are "src", "src/java" and "src/java/Applets", for which hash codes are incrementally computed. Now, LE 2140 is looked at. Since it maps pathnames with two components, only "src/java" and its hash code are considered. This leads to ME4_2 (2060, FIG. 3*a*) and to the residual pathname "Applets/app.java". Since the maximum pathname component count for ME4_2 2060 is zero, there is no underlying ME to go to. So, the final result is the ordered pair <MDV4_2, "Applets/app.java"> (step 1230 in FIG. 11) and the request will be sent to MDV4_2, which will interpret and process the request (see 1300 in FIG. 11).

FIG. 7 represents one implementation of operation 607, which searches for a matching mount entry in the current ME list. The matching mount entry is the one whose relative pathname matches a portion of the current pathname beginning with its first path component. For example, if the current pathname is "user/local/tmp" and there are two mount entries in the ME list whose relative pathnames are, respectively, "user" and "tmp", The former entry is the matching entry since its relative pathname matches the first path component in the current pathname, while the latter is not the matching entry because its relative pathname does not match the first component in the current pathname. The fact that the latter entry "tmp" matches the third path component in the current pathname is irrelevant for the purposes of locating a matching mount entry. The comparison between the path components in the current pathname and the one in the relative pathname may be implemented as a string comparison. In one embodiment, if the pathname in a user request is not already in the same format as the relative pathnames in the mount entry, the pathname in the user request is converted into the format of the relative pathnames in the mount entries.

An efficient method of identifying the matching mount entry in the ME list is to calculate the hash code for a first portion of the current pathname, and performing a hash table lookup based on the hash code, because hash code calculation and table lookup is often faster than the string comparison. The result of the hash table lookup directs the file switch (which is performing the pathname search operation) to an appropriate bucket, i.e., the matching mount entry in the ME list. When the current pathname has multiple path components, multiple hash codes may be generated. For example, if the current pathname is "user/local/tmp", the file switch may generate three respective hash codes for the partial pathnames "user", "user/local" and "user/local/tmp". Among them, there is at most one hash code, if any, having a matching mount entry in the ME list (i.e., with a matching hash code) and this matching entry must belong to one of the list entries having a path component count equal to the path component count for the portion of the current pathname used to generate the matching hash code.

It is noted that the path component counts for the list entries in an ME list need not be continuous. Therefore, it may not be necessary to calculate a hash code for every possible partial current pathname. Rather, for a given current pathname, hash codes need to be generated only for those path component counts that (A) have an associated list entry for the current metadata server's ME list, and (B) which do not exceed the number of components in the current pathname. Further, as explained next, these hash codes can be computed one at a time, starting with the smallest component count, until either a matching entry is found, or the search for a matching entry is exhausted without success.

In the embodiment shown in FIG. 7, the file switch identifies a set of unique path component counts in the ME list of the current metadata server (710), each count corresponding to one list entry in the ME list. Starting with the smallest unique path component count (712), the file switch calculates the hash code for the partial current pathname having the unique count of path components (720) and compares the hash code with the hash codes in the corresponding list entry (LE) 730. If the matching mount entry is found in the list entry (730—Yes), the file switch will examine the matching metadata server's ME list for a new match 609. If no match is found in the list entry (730—No), the file switch determines if the set of unique path component counts has at least one count larger than the current count 740. If not (740—No), there is no mount entry in any list entry matching any portion of the current pathname and the file switch performs operation 615 (described above) to find the metadata file associated with the user-specified file.

Otherwise (740—Yes), the file switch identifies the next unique path component count, which is the smallest path count not yet processed, and returns to operation 720 to generate a new hash code for a new partial current pathname. In one embodiment, if the hash code generation is not completely unique, the file switch may need to conduct a string comparison after hash code-based matching 730 to verify that it has located an entry with a relative pathname matching a partial pathname of the specified file.

Figure 8:
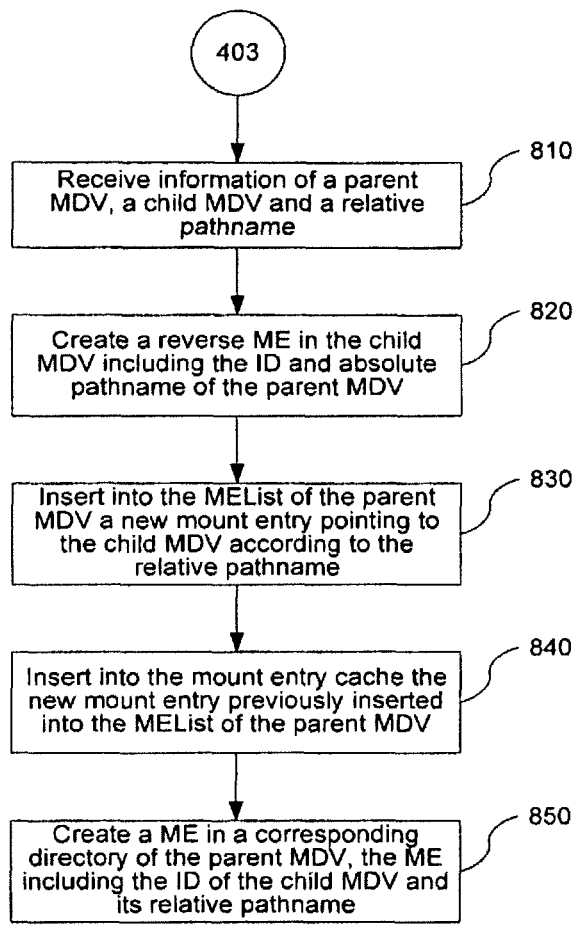
FIG. 8 is a flowchart illustrating an embodiment of the operations in a mount entry insertion with respect to the metadata hierarchical directory structure.

FIG. 8 is a flowchart illustrating an embodiment of the operations in the mount entry insertion 405 (FIG. 4) with respect to the metadata hierarchical directory structure. A mount entry insertion occurs when a new mount entry is added to the mount entry list for an identified metadata volume. The new mount entry represents a new metadata volume that has been added to the aggregated file system. Alternately, when a child metadata volume is moved within the hierarchical directory structure represented by the metadata volumes, a mount entry deletion and a mount entry insertion are required in order to implement the change of the child metadata volume's position in the hierarchy.

On receipt of the mount entry insertion request 403, the file switch retrieves (810) from the insertion request information identifying the parent metadata volume, the child metadata volume (e.g., a new metadata volume being added to the system) and the relative pathname of the child metadata volume in the directory structure of the parent metadata volume. The file switch identifies the child metadata volume and creates a reverse mapper in the child metadata volume (820). In some embodiments, the reverse mapper is a file located in or referenced by the root directory of the child metadata volume. The reverse mapper includes the ID of the parent metadata volume and the relative pathname of the ME pointing to the volume with respect to the root directory of the parent volume. The file switch subsequently opens the ME list of the parent metadata volume and inserts into it a new mount entry pointing to the child metadata volume (830) according to the relative pathname. Next, if the ME list of the parent metadata volume has been loaded into the mount entry cache, the file switch synchronizes the mount entry cache with the ME list of the parent metadata volume by inserting the newly created mount entry into the mount entry cache (840). In some embodiments, the file switch further identifies an appropriate directory in the parent metadata volume and creates a new mount entry in the directory (850) (e.g., by storing a record within the directory, or by storing within the directory a reference to a file containing the new mount entry). The new mount entry in the directory includes the ID of the child metadata volume.

Note that creating a reverse mapper (820) is redundant, since the file switch only needs to visit the ME list itself within each parent metadata volume to create a complete mount entry cache for the aggregated file system 140. However, storing such redundant information in the metadata volumes makes sure that the aggregated file system 140 (FIG. 1) is able to efficiently reconstruct the metadata hierarchical directory structure after a system crash.

Figure 9:
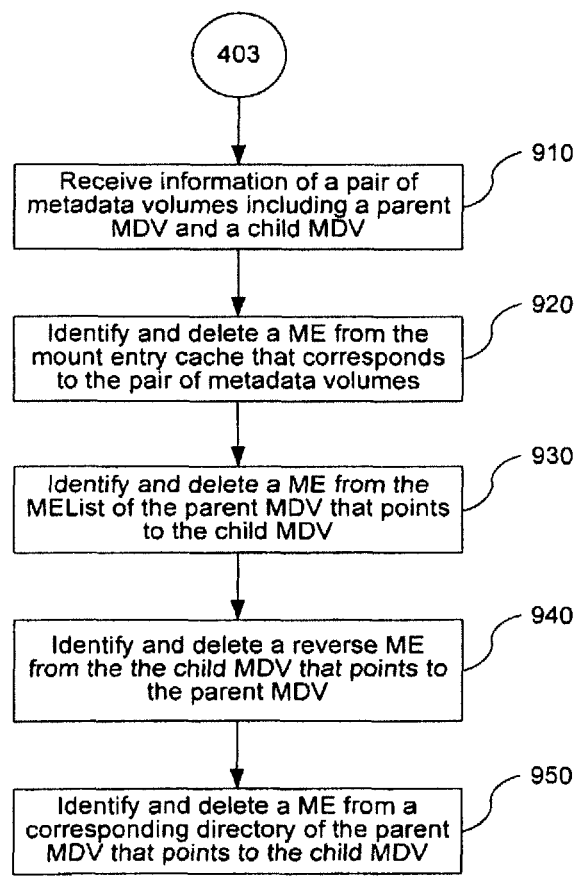
FIG. 9 is a flowchart illustrating an embodiment of the operations in a mount entry deletion with respect to the metadata hierarchical directory structure.

FIG. 9 is a flowchart illustrating an embodiment of the mount entry deletion operation 409 (FIG. 4) with respect to the metadata hierarchical directory structure. Note that the processing order of the mount entry deletion 409 (FIG. 4) is opposite to that of the mount entry insertion 405 (FIG. 4). On receipt of the mount entry deletion request 403, the file switch retrieves from the deletion request information identifying a pair of metadata volumes including a parent metadata volume and a child metadata volume (910). The file switch identifies and deletes a mount entry in its associated mount entry cache that corresponds to the pair of parent and child metadata volumes (920). As a result, the metadata files stored in the child metadata volume are immediately inaccessible to the client. The file switch furthermore identifies and deletes a mount entry from the ME list of the parent metadata volume that points to the child metadata volume (930) and, if the child metadata volume is still part of the aggregated file system, a reverse mapper from the child metadata volume that points to the parent metadata volume (940). In some embodiments, the file switch also identifies and deletes a mount entry from a directory in the parent metadata volume that is associated with the child metadata volume according to its relative pathname (950).

Figure 10:
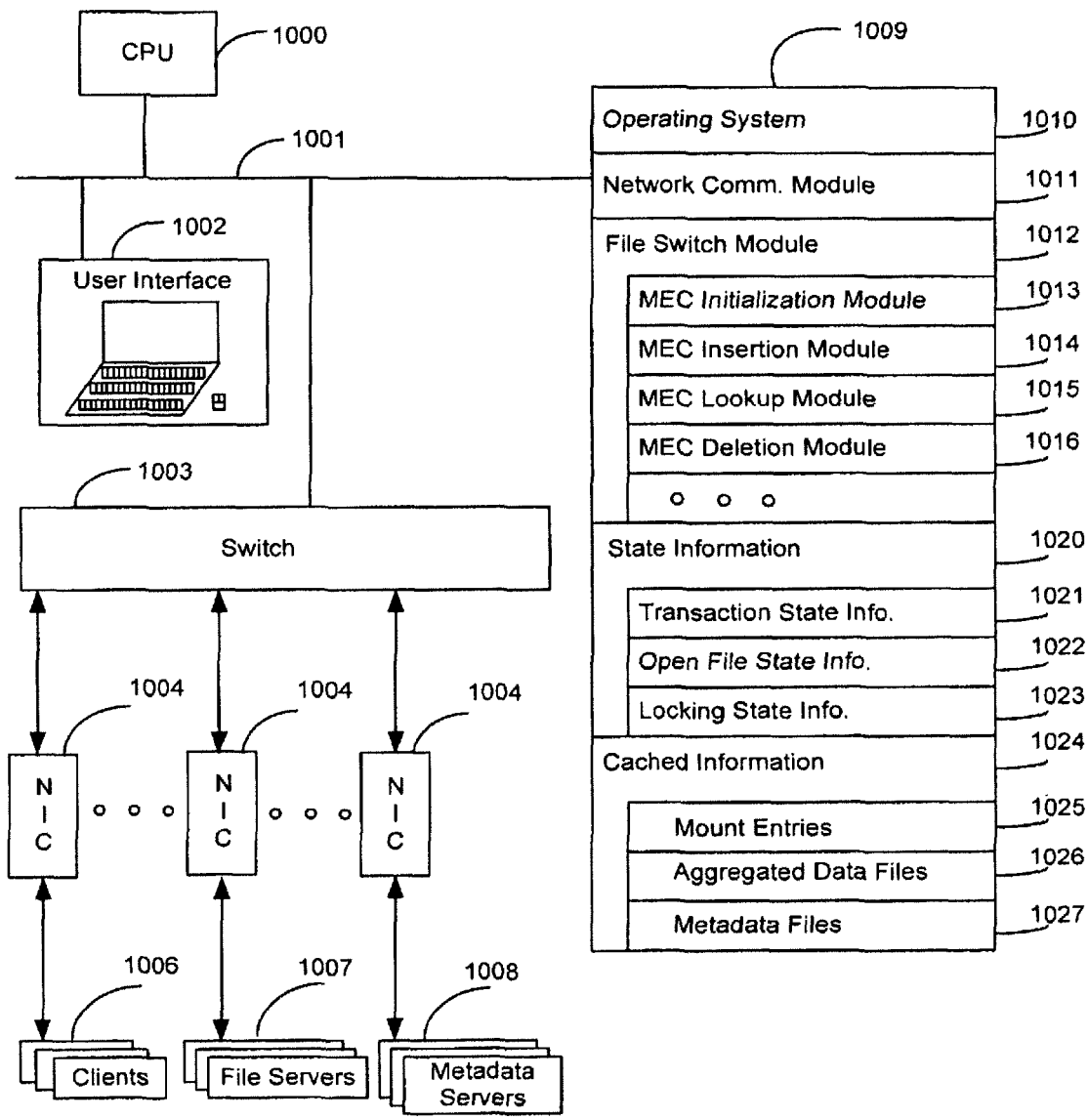
FIG. 10 is a diagram illustrating an embodiment of a file switch configuration.

In some embodiments, a file switch (e.g., file switch 152 or 154) (FIG. 1) of the aggregated file system 140 (FIG. 1) is implemented using a computer system schematically shown in FIG. 10. The file switch comprises one or more processing units (CPUs) 1000, a memory device 1009, one or more network or other communication interface circuits 1004 for interconnecting a plurality of clients 1006, file servers 1007 and metadata servers 1008 (each managing one or more metadata volumes), a switch 1003 or bus interface for connecting the network interface circuits to one or more system buses 1001 that interconnect these components. The file switch may optionally have a user interface 1002, although in some embodiments the file switch is managed using a workstation connected to the file switch via one of the network interface circuits 1004. In alternate embodiments, much of the functionality of the file switch may be implemented in one or more application specific integrated circuits (ASIC's), thereby either eliminating the need for the CPU, or reducing the role of the CPU in the handling file access requests by client computers.

The memory 1009 may include high speed random access memory and may also include non volatile memory, such as one or more magnetic disk storage devices. The memory 1009 may include mass storage that is remotely located from the central processing unit(s) 1000. The memory 1009 stores:

- an operating system 1010 that includes procedures for handling various basic system services and for performing hardware dependent tasks;
- a network communication module 1011 that is used for controlling communication between the system and clients 1006, file servers 1007 and metadata servers 1008 via the network interface circuits 1004 and one or more communication networks, such as the Internet, other wide area networks, local area networks, metropolitan area networks, or combinations of two or more of these networks;
- a file switch module 1012, for implementing many of the main aspects of the aggregate file system 140 (FIG. 1), including a mount entry cache (MEC) initialization module 1013, a MEC insertion module 1014, a MEC lookup module 1015 and a MEC deletion module 1016;
- file state information 1020, including transaction state information 1021, open file state information 1022 and locking state information 1023; and
- cached information 1024, including mount entry cache 1025, cached (and aggregated) data files 1026 and corresponding metadata files 1027.

The file switch module 1012, the state information 1020 and the cached information 1024 may include executable procedures, sub-modules, tables and other data structures. In other embodiments, additional or different modules and data structures may be used, and some of the modules and/or data structures listed above may not be used.

As shown in FIG. 1, a user-specific file's metadata is stored in one or more metadata servers (162, 164) and separated from the file's user data that is stored in one or more file servers (142, 144). In order to satisfy a request to access a particular file, a file switch first visits a set of metadata servers based on the identified target metadata volume to identifies a set of file servers hosting the user data of the requested file and then visits each of the file servers to retrieve the requested user data. One benefit inherent in this configuration is that a file switch may be able to retrieve the user data from multiple file servers more efficiently, e.g., in a parallel mode, when certain data striping or mirroring strategies are employed by the aggregated file system.

According to another embodiment, a self-sustained file server can be incorporated into the aggregated file system by generating in the file system's mount entry caches a new mount entry representing the file server and making the file system hierarchy associated with file server a subset of the file system hierarchy associated with the aggregated file system. In this embodiment, the volumes managed by the file server remain in their native format and the file server is insulated from any data striping or mirroring strategy implemented in the aggregated file system. When a file switch processes a file access request for a file stored in the self-sustained file server, it is only responsible for identifying a volume within the file server. All subsequent processing, including access to the requested files, is exclusively handled by the file server itself with respect to both the file's user data and the metadata.

To incorporate this self-sustained file server into an existing aggregated file system, there is little modification to the aggregated file system except inserting into the mount entry caches of the aggregated file system a new mount entry corresponding to the file server and associating the new entry with some existing ones in the metadata hierarchical directory structure of the file system. A file access request can be satisfied by just one visit to the file server since both the file's metadata and user data can be found therein. By the same token, the task of disconnecting the file server from the aggregated file system is also less complicated. The file system only needs to identify and update or eliminate entries in the mount entry caches that are relevant to the file server.

In particular, if the self-sustained file server joins or leaves an aggregated file system as a member associated with one leaf node of the hierarchical directory structure of the aggregated file system, the only change to the mount entry cache is to update the mount entry list associated with the parent node of the leaf node, because this is the only member of the existing system that has a logical connection with the self-sustained file server. But if the file server joins or leaves the aggregated file system as a member associated with an intermediate node, additional changes to the data in the mount entry cache are needed to ensure that the mount entry lists associated with its parent and child nodes are updated to reflect the change to the hierarchy and to ensure there is no name conflict between the new file server and any existing ones in the metadata hierarchical data structure.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed:

1. A method of handling a file processing request in an aggregated file system, comprising:

receiving a request with respect to a file, the request identifying an absolute pathname of the file in the aggregated file system;

identifying a target metadata volume that hosts metadata of the file among a plurality of metadata volumes in accordance with the request and one or more mount entries each associated with a respective one of the plurality of metadata volumes, including recursively:

identifying a mount entry when associated with a current metadata volume, wherein the mount entry identifies a relative pathname matching a respective portion of the absolute pathname, the identified relative pathname further comprising pathname sub-components of sizes ranging from one pathname component to a size of the identified relative pathname; and selecting at least one of the pathname sub-components using the identified mount entry based upon a number indicated in a list entry pointed to by the identified mount entry, until no mount entry associated with a current metadata volume matches a respective portion of the absolute pathname, to set the current metadata volume; and identifying the current metadata volume as the target metadata volume and sending the request to a metadata server hosting the identified target metadata volume in response to the request to a file switch for assembling the file.

2. The method of claim 1, wherein the recursively identifying includes producing a residual pathname by removing from the absolute pathname the relative pathname associated with each identified mount entry.

3. The method of claim 1, wherein the absolute pathname of the file is unique in the aggregated file system.

4. The method of claim 1, wherein at least a subset of the plurality of metadata volumes includes one or more mount entries, each mount entry identifying a respective distinct child metadata volume and an associated relative pathname.

5. The method of claim 4, wherein at least one metadata volume in the subset of the plurality of metadata volumes includes a reverse mapper, the reverse mapper identifying a parent metadata volume.

6. The method of claim 1, wherein:

the plurality of metadata volumes include at least one root metadata volume, one or more intermediate metadata volumes and one or more leaf metadata volumes, and wherein the root metadata volume is a metadata volume that has no parent metadata volume, the leaf metadata volume is a metadata volume that has no child metadata volume and the intermediate metadata volume is a metadata volume that has both at least one parent and at least one child metadata volumes;

the target metadata volume is one of the root metadata volumes when none of the child metadata volumes directly referenced by at least one of the root metadata volumes has an associated relative pathname matching a portion of the absolute pathname;

the target metadata volume is one of the intermediate metadata volumes when at least one of the intermediate metadata volumes has an associated relative pathname matching a portion of the absolute pathname and none of the child metadata volumes referenced by at least one of the intermediate metadata volumes has an associated relative pathname matching a portion of the absolute pathname; and the target metadata volume is one of the leaf metadata volumes referenced by at least one of the root metadata volumes using one or more mount entries when at least one of the leaf metadata volumes has an associated relative pathname matching a portion of the absolute pathname.

7. The method of claim 1, further comprising:

forming an ordered pair comprising the identified target metadata volume and a residual pathname, if any, based upon said identifying of the target metadata volume.

8. The method of claim 1 further comprising:

accessing a plurality of mount entries, wherein each of the plurality of mount entries is associated with a respective one of the plurality of metadata volumes as a parent metadata volume and identifies a respective distinct child metadata volume and the relative pathname associated with the child metadata volume;

resetting the current metadata volume to the child metadata volume identified by the identified mount entry, until no mount entry associated with the current metadata volume is found that matches a respective portion of the absolute pathname, the target metadata volume comprising the last child metadata volume so identified; and returning information identifying the target metadata volume, hosted metadata and its associated residual pathname in response to the request to a file switch for assembling the file in response to the request.

9. The method of claim 1, wherein the identified relative pathname has a size based upon a maximum number of pathname components of the relative pathname that can be handled by the identified mount entry.

10. An apparatus for handling a file processing request in an aggregated file system, comprising:
at least one processor; and
memory coupled to the at least one processor which is configured to execute program instructions stored in the memory comprising:
receiving a request with respect to a specified file, the request including an absolute pathname of the specified file in the aggregated file system;
identifying a target metadata volume that hosts metadata of the file among a plurality of metadata volumes in accordance with the request and one or more mount entries each associated with a respective one of the plurality of metadata volumes, including recursively:
identifying a mount entry when associated with a current metadata volume, wherein the mount entry identifies a relative pathname matching a respective portion of the absolute pathname, the identified relative pathname further comprising pathname sub-components of sizes ranging from one pathname component to a size of the identified relative pathname; and
selecting at least one of the pathname sub-components using the identified mount entry based upon a number indicated in a list entry pointed to by the identified mount entry, until no mount entry associated with a current metadata volume matches a respective portion of the absolute pathname, to set the current metadata volume; and
identifying the current metadata volume as the target metadata volume and sending the request to a metadata server hosting the identified target metadata volume in response to the request to a file switch for assembling the file.

11. The apparatus of claim 10, wherein the recursively identifying includes producing a residual pathname by removing from the absolute pathname the relative pathname associated with each identified mount entry.

12. The apparatus of claim 10, wherein the absolute pathname of the file is unique in the aggregated file system.

13. The apparatus of claim 10, wherein at least a subset of the plurality of metadata volumes includes one or more mount entries, each mount entry identifying a respective distinct child metadata volume and an associated relative pathname.

14. The apparatus of claim 13, wherein at least one metadata volume in the subset of the plurality of metadata volumes includes a reverse mapper, the reverse mapper identifying a parent metadata volume.

15. The apparatus of claim 10, wherein:
the plurality of metadata volumes include at least one root metadata volume, one or more intermediate metadata volumes and one or more leaf metadata volumes, and wherein the root metadata volume is a metadata volume that has no parent metadata volume, the leaf metadata volume is a metadata volume that has no child metadata volume and the intermediate metadata volume is a metadata volume that has both at least one parent and at least one child metadata volumes;

the target metadata volume is one of the root metadata volumes when none of the child metadata volumes directly referenced by at least one of the root metadata volumes has an associated relative pathname matching a portion of the absolute pathname;

the target metadata volume is one of the intermediate metadata volumes when at least one of the intermediate metadata volumes has an associated relative pathname matching a portion of the absolute pathname and none of the child metadata volumes referenced by at least one of the intermediate metadata volumes has an associated relative pathname matching a portion of the absolute pathname; and the target metadata volume is one of the leaf metadata volumes referenced by at least one of the root metadata volumes using one or more mount entries when at least one of the leaf metadata volumes has an associated relative pathname matching a portion of the absolute pathname.

16. The apparatus of claim 10 wherein the at least one processor is further configured to execute programmed instructions stored in the memory further comprising forming an ordered pair comprising the identified target metadata volume and a residual pathname, if any, based upon said identifying of the target metadata volume.

17. The apparatus of claim 10 wherein the at least one processor is further configured to execute programmed instructions stored in the memory further comprising:
accessing a plurality of mount entries, wherein each of the plurality of mount entries is associated with a respective one of the plurality of metadata volumes as a parent metadata volume and identifies a respective distinct child metadata volume and the relative pathname associated with the child metadata volume;

resetting the current metadata volume to the child metadata volume identified by the identified mount entry, until no mount entry associated with the current metadata volume is found that matches a respective portion of the absolute pathname, the target metadata volume comprising the last child metadata volume so identified; and returning information identifying the target metadata volume, hosted metadata and its associated residual pathname in response to the request to a file switch for assembling the file in response to the request.

18. The apparatus of claim 10, wherein the identified relative pathname has a size based upon a maximum number of pathname components of the relative pathname that can be handled by the identified mount entry.

19. A non-transitory computer readable medium having stored thereon instructions for handling a file processing request in an aggregated file system comprising machine executable code which when executed by at least one processor, causes the processor to perform steps comprising:
receiving a request with respect to a specified file, the request including an absolute pathname of the specified file in the aggregated file system;
identifying a target metadata volume that hosts metadata of the file among a plurality of metadata volumes in accordance with the request and one or more mount entries each associated with a respective one of the plurality of metadata volumes, including recursively:
identifying a mount entry when associated with a current metadata volume, wherein the mount entry identifies a relative pathname matching a respective portion of the absolute pathname, the identified relative pathname further comprising pathname sub-components of sizes ranging from one pathname component to a size of the identified relative pathname; and
selecting at least one of the pathname sub-components using the identified mount entry based upon a number indicated in a list entry pointed to by the identified mount entry, until no mount entry associated with a current metadata volume matches a respective portion of the absolute pathname, to set the current metadata volume; and
identifying the current metadata volume as the target metadata volume and sending the request to a metadata server hosting the identified target metadata volume in response to the request to a file switch for assembling the file.

20. The medium of claim 19, wherein the recursively identifying includes producing a residual pathname by removing from the absolute pathname the relative pathname associated with each identified mount entry.

21. The medium of claim 19, wherein the absolute pathname of the file is unique in the aggregated file system.

22. The medium of claim 19, wherein at least a subset of the plurality of metadata volumes includes one or more mount entries, each mount entry identifying a respective distinct child metadata volume and an associated relative pathname.

23. The medium of claim 22, wherein at least one metadata volume in the subset of the plurality of metadata volumes includes a reverse mapper, the reverse mapper identifying a parent metadata volume.

24. The medium of claim 19, wherein:
the plurality of metadata volumes include at least one root metadata volume, one or more intermediate metadata volumes and one or more leaf metadata volumes, and wherein the root metadata volume is a metadata volume that has no parent metadata volume, the leaf metadata volume is a metadata volume that has no child metadata volume and the intermediate metadata volume is a metadata volume that has both at least one parent and at least one child metadata volumes;
the target metadata volume is one of the root metadata volumes when none of the child metadata volumes directly referenced by at least one of the root metadata volumes has an associated relative pathname matching a portion of the absolute pathname;
the target metadata volume is one of the intermediate metadata volumes when at least one of the intermediate metadata volumes has an associated relative pathname matching a portion of the absolute pathname and none of the child metadata volumes referenced by at least one of the intermediate metadata volumes has an associated relative pathname matching a portion of the absolute pathname; and
the target metadata volume is one of the leaf metadata volumes referenced by at least one of the root metadata volumes using one or more mount entries when at least one of the leaf metadata volumes has an associated relative pathname matching a portion of the absolute pathname.

25. The medium of claim 19, further having stored thereon instructions that when executed by the processor causes the process to perform steps comprising forming an ordered pair comprising the identified target metadata volume and a residual pathname, if any, based upon said identifying of the target metadata volume.

26. The medium of claim 19 further having stored thereon instructions that when executed by the processor causes the process to perform steps comprising:
accessing a plurality of mount entries, wherein each of the plurality of mount entries is associated with a respective one of the plurality of metadata volumes as a parent metadata volume and identifies a respective distinct child metadata volume and the relative pathname associated with the child metadata volume;
resetting the current metadata volume to the child metadata volume identified by the identified mount entry, until no mount entry associated with the current metadata volume is found that matches a respective portion of the absolute pathname, the target metadata volume comprising the last child metadata volume so identified; and
returning information identifying the target metadata volume, hosted metadata and its associated residual pathname in response to the request to a file switch for assembling the file in response to the request.

27. The medium of claim 19, wherein the identified relative pathname has a size based upon a maximum number of pathname components of the relative pathname that can be handled by the identified mount entry.

28. An aggregated file system, comprising:
a plurality of file servers;
a plurality of metadata servers including a plurality of metadata volumes; and
a plurality of file switches, each file switch including:
at least one processor; and
memory coupled to the at least one processor which is configured to execute program instructions stored in the memory comprising:
receiving a request with respect to a specified file, the request including an absolute pathname of the specified file in the aggregated file system;
identifying a target metadata volume that hosts metadata of the file among the plurality of metadata volumes in accordance with the request and one or more mount entries each associated with a respective one of the plurality of metadata volumes, including recursively:
identifying a mount entry when associated with a current metadata volume, wherein the mount entry identifies a relative pathname matching a respective portion of the absolute pathname, the identified relative pathname further comprising pathname sub-components of sizes ranging from one pathname component to a size of the identified relative pathname; and
selecting at least one of the pathname sub-components using the identified mount entry based upon a number indicated in a list entry pointed to by the identified mount entry, until no mount entry associated with a current metadata volume matches a respective portion of the absolute pathname, to set the current metadata volume; and
identifying the current metadata volume as the target metadata volume and sending the request to a metadata server hosting the identified target metadata volume in response to the request to a file switch for assembling the file.

29. The system of claim 28, wherein the recursively identifying includes producing a residual pathname by removing from the absolute pathname the relative pathname associated with each identified mount entry.

30. The system of claim 28, wherein the absolute pathname of the file is unique in the aggregated file system.

31. The system of claim 28, wherein at least a subset of the plurality of metadata volumes includes one or more mount entries, each mount entry identifying a respective distinct child metadata volume and an associated relative pathname.

32. The system of claim 31, wherein at least one metadata volume in the subset of the plurality of metadata volumes includes a reverse mapper, the reverse mapper identifying a parent metadata volume.

33. The system of claim 28, wherein:
the plurality of metadata volumes include at least one root metadata volume, one or more intermediate metadata volumes and one or more leaf metadata volumes, and wherein the root metadata volume is a metadata volume that has no parent metadata volume, the leaf metadata volume is a metadata volume that has no child metadata volume and the intermediate metadata volume is a metadata volume that has both at least one parent and at least one child metadata volumes;
the target metadata volume is one of the root metadata volumes when none of the child metadata volumes directly referenced by at least one of the root metadata volumes has an associated relative pathname matching a portion of the absolute pathname;
the target metadata volume is one of the intermediate metadata volumes when at least one of the intermediate metadata volumes has an associated relative pathname matching a portion of the absolute pathname and none of the child metadata volumes referenced by at least one of the intermediate metadata volumes has an associated relative pathname matching a portion of the absolute pathname; and
the target metadata volume is one of the leaf metadata volumes referenced by at least one of the root metadata volumes using one or more mount entries when at least one of the leaf metadata volumes has an associated relative pathname matching a portion of the absolute pathname.

34. The system of claim 28 wherein the at least one processor is further configured to execute programmed instructions stored in the memory further comprising forming an ordered pair comprising the identified target metadata volume and a residual pathname, if any, based upon said identifying of the target metadata volume.

35. The system of claim 28 wherein the at least one processor is further configured to execute programmed instructions stored in the memory further comprising:
accessing a plurality of mount entries, wherein each of the plurality of mount entries is associated with a respective one of the plurality of metadata volumes as a parent metadata volume and identifies a respective distinct child metadata volume and the relative pathname associated with the child metadata volume;
resetting the current metadata volume to the child metadata volume identified by the identified mount entry, until no mount entry associated with the current metadata volume is found that matches a respective portion of the absolute pathname, the target metadata volume comprising the last child metadata volume so identified; and
returning information identifying the target metadata volume, hosted metadata and its associated residual pathname in response to the request to a file switch for assembling the file in response to the request.

36. The system of claim 28, wherein the identified relative pathname has a size based upon a maximum number of pathname components of the relative pathname that can be handled by the identified mount entry.

* * * * *